US012761757B2

(12) United States Patent
Matuo et al.

(10) Patent No.: US 12,761,757 B2
(45) Date of Patent: Oct. 13, 2026

(54) ELECTRONIC DEVICES AND CORRESPONDING METHODS ENABLING CONTROL OPERATION PERFORMANCE IN RESPONSE TO USER INPUT MOTION DETECTED BY AN IMAGE CAPTURE DEVICE

(71) Applicant: Motorola Mobility LLC, Chicago, IL (US)

(72) Inventors: Rafael Matuo, Sumaré (BR); Nicolas Riccieri Gardin Assumpcao, Campinas (BR); Luis Fernando Momente, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 19/062,996

(22) Filed: Feb. 25, 2025

(65) Prior Publication Data

US 2026/0252196 A1 Aug. 27, 2026

(51) Int. Cl.

| | |
|---|---|
| ***G06F 3/042*** | (2006.01) |
| ***A63F 13/213*** | (2014.01) |
| ***G06F 1/16*** | (2006.01) |
| ***G06F 3/01*** | (2006.01) |
| ***G06F 3/0346*** | (2013.01) |
| ***G06F 3/0485*** | (2022.01) |
| ***G06F 21/36*** | (2013.01) |
| ***G06V 40/20*** | (2022.01) |

(52) U.S. Cl.

CPC ............ *G06F 3/042* (2013.01); *A63F 13/213* (2014.09); *G06F 1/1677* (2013.01); *G06F 3/017* (2013.01); *G06F 3/0346* (2013.01); *G06F 3/0485* (2013.01); *G06F 21/36* (2013.01); *G06V 40/28* (2022.01)

(58) Field of Classification Search

CPC ........ G06F 3/042; G06F 1/1677; G06F 3/017; G06F 3/0346; G06F 3/0485; G06F 21/36; A63F 13/213; G06V 40/28

See application file for complete search history.

(56) References Cited

U.S. PATENT DOCUMENTS

| | | | |
|---|---|---|---|
| 10,528,912 B2 * | 1/2020 | Berger .................. | G06Q 10/10 |
| 10,990,260 B2 | 4/2021 | Gorsica et al. | |
| 11,302,113 B1 | 4/2022 | Luiz Leal Chagas do Nascimento | |
| 2004/0208348 A1 * | 10/2004 | Baharav ................ | G06F 3/0421 382/124 |
| 2010/0048241 A1 * | 2/2010 | Seguin .................... | G06F 3/011 455/556.1 |

(Continued)

*Primary Examiner* — Grant Sitta
(74) *Attorney, Agent, or Firm* — Philip H. Burrus, IV

(57) ABSTRACT

An electronic device includes at least one image capture device, at least one display, and one or more processors. The one or more processors use signals from an image capture device to detect an object interacting with the image capture device in accordance with a user input motion by contacting a surface of the electronic device where the image capture device is situated. The one or more processors then perform, in response to the object interacting with the at least one image capture device, a control operation associated with the user input motion. This allows the image capture device to function as a user interface button, trackpad, mouse, or other user interface control.

20 Claims, 9 Drawing Sheets

(56) References Cited

U.S. PATENT DOCUMENTS

| | | | | |
|---|---|---|---|---|
| 2014/0201827 | A1* | 7/2014 | Okazaki | G06F 1/1684 726/7 |
| 2019/0196708 | A1* | 6/2019 | Donelli | G06F 3/0412 |
| 2021/0407260 | A1* | 12/2021 | Kuzhiyil | G06F 1/1684 |
| 2022/0116533 | A1* | 4/2022 | Yan | G06F 1/1677 |
| 2022/0151091 | A1* | 5/2022 | Kang | G06F 1/1677 |
| 2023/0298498 | A1* | 9/2023 | Luo | G09G 3/035 345/659 |
| 2023/0308775 | A1* | 9/2023 | Desai | G06V 10/945 |

* cited by examiner

ELECTRONIC DEVICES AND CORRESPONDING METHODS ENABLING CONTROL OPERATION PERFORMANCE IN RESPONSE TO USER INPUT MOTION DETECTED BY AN IMAGE CAPTURE DEVICE

BACKGROUND

Technical Field

This disclosure relates generally to electronic devices, and more particularly to electronic devices having image capture devices.

Background Art

In recent years, foldable electronic devices, such as smartphones, have gained significant traction in the premium market segment, offering users a distinctive blend of compactness and functionality. In contrast to "candy bar" devices that do not fold, "clam shell" devices that fold around a hinge frequently carry and utilize more than one display, thereby allowing for enhanced user interaction with the device. Still, challenges lie in developing new user interaction paradigms that maximize the potential of foldable devices. It would be advantageous to have improved electronic devices and corresponding methods enhancing user interaction with a foldable device, thereby making the same them more engaging and user-friendly.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
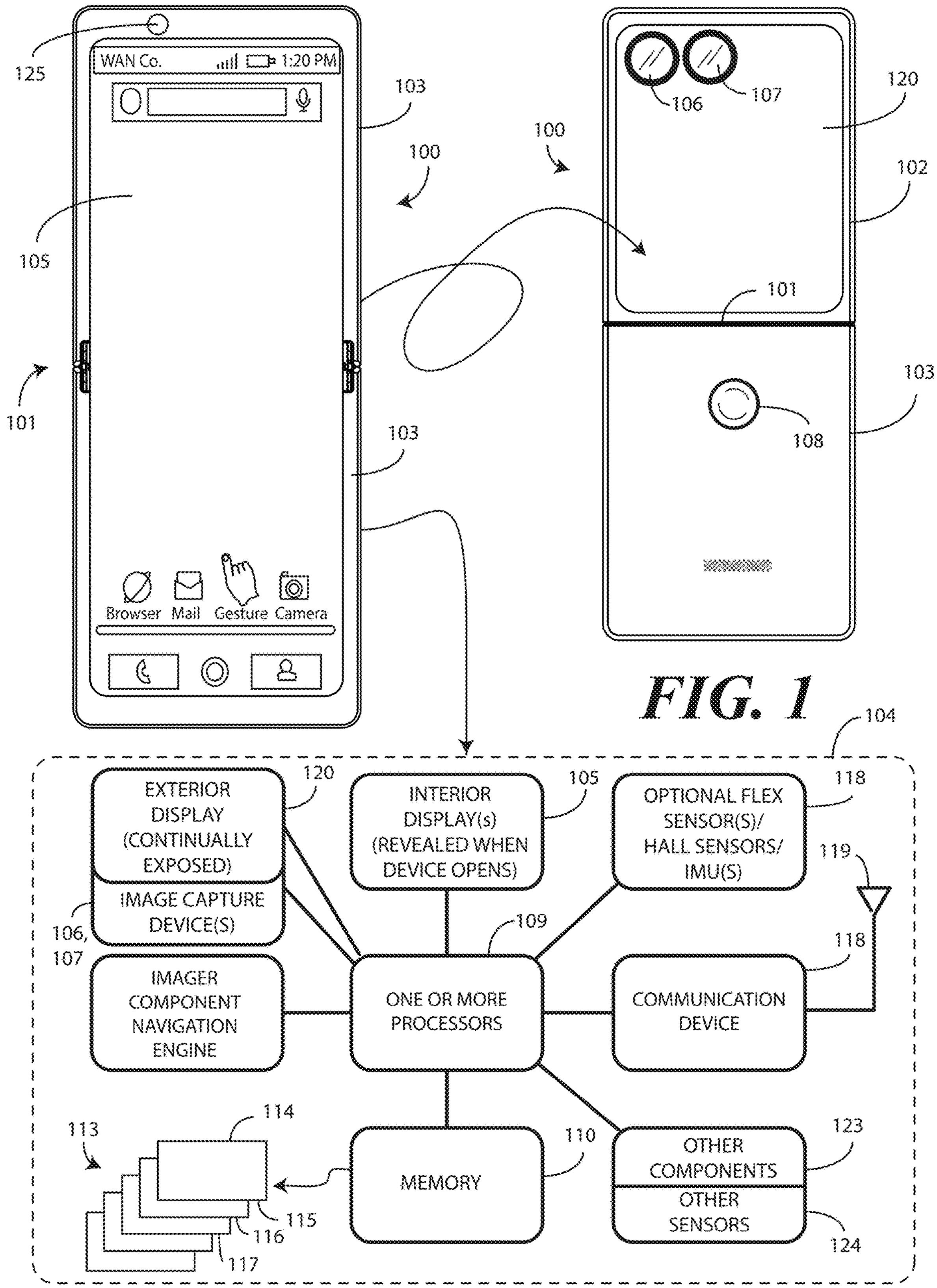
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, with an image capture device of the electronic device, an object contacting an exterior surface of the electronic device at a location where the image capture device is situated and interacting with image capture device at the location in accordance with a predefined user input motion, correlating, by one or more processors operable with the image capture device, the predefined user input motion with a control operation, and performing, by the one or more processors, the control operation in response to the interaction of the object with the image capture device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of using one or more processors to use signals from at least one image capture device to detect an object interacting with the at least one image capture device in accordance with a user input motion by contacting a surface of the electronic device where the at least one image capture device is situated and performing, in response to the object interacting with the at least one image capture device, a control operation associated with the user input motion as described herein. The non-processor circuits may include, but are not limited to, a radio receiver, a radio transmitter, signal drivers, clock circuits, power source circuits, and user input devices.

As such, these functions may be interpreted as steps of a method to perform the steps of detecting, with an image capture device that is exposed both when a first device housing that is pivotable about a hinge relative to a second device housing between an axially displaced open position and a closed position are in the axially displaced open position and in the closed position, user input from an object interacting with the image capture device while the first device housing is pivoted relative to the second device housing to the closed position and controlling, by one or more processors, content presented on a display that is also exposed both when the first device housing and the second device housing are in the axially displaced open position and the closed position in accordance with the user input. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, foldable electronic devices with flexible displays have introduced a new dimension to mobile device design, offering users the flexibility of a compact form factor with the functionality of a larger display. However, despite their innovative design, embodiments of the disclosure contemplate that foldable devices have yet to fully capitalize on their distinct hardware features to enhance user interaction.

Illustrating by example, current foldable smartphones often rely on traditional touch-based navigation methods, which can be cumbersome and unintuitive, particularly when the device is in a closed position. This limitation restricts the potential for more seamless and efficient user experiences, especially in scenarios where quick access to frequently used applications or functions is desired.

Moreover, existing solutions in the realm of mobile device interaction have attempted to address these challenges through various gesture-based controls. For instance, some devices utilize accelerometer-based gestures, such as shaking or tapping, to perform specific actions. However, these implementations often lack precision and can result in unintended activations, leading to user frustration.

Additionally, while some devices incorporate external displays or sensors, they are typically underutilized, serving primarily as secondary screens rather than being fully integrated into the user interface. Embodiments of the disclosure contemplate this underutilization fails to leverage the full potential of the foldable form factor, leaving a gap in the market for more innovative and intuitive interaction methods.

Advantageously, embodiments of the disclosure overcome these limitations by introducing a novel approach to user interaction with foldable electronic devices. By utilizing on-board image capture devices, optionally with other components such as improved hinge mechanisms, embodiments of the disclosure detect objects contacting an exterior surface of the electronic device at a location where an image capture device is situated and interacting with image capture device at the location in accordance with a predefined user input motion. In one or more embodiments, one or more processors operable with the image capture device correlate the predefined user input motion with a control operation. In one or more embodiments, the one or more processors then perform the control operation in response to the interaction of the object with the image capture device.

Advantageously, embodiments of the disclosure provide a more intuitive and efficient way to control the user interface, even when the device is closed. Embodiments of the disclosure not only enhance the usability of a foldable electronic device but also offer a more engaging and seamless user experience.

In one or more embodiments, methods and electronic devices described herein leverage an image capture device as a multifunctional input mechanism, thereby allowing users to perform a variety of control operations through predefined user input motions. Additionally, embodiments of the disclosure can optionally leverage gesture-based controls, such as tapping on the hinge or shaking the device, to activate or deactivate specific functions, thereby increasing the utility of the foldable form factor. Through these innovations, embodiments of the disclosure aim to redefine the way users interact with their foldable devices, thereby offering a more intuitive and efficient user experience.

Detecting an object interacting with an image capture device, correlating this interaction with a predefined user input motion, and performing a control operation based on this interaction advantageously introduces a novel way of utilizing the image capture device as an input mechanism, which is distinct from the traditional use for capturing images or video. By leveraging the image capture device to detect user input motions, the method provides an alternative interface for user interaction, particularly beneficial for foldable devices where traditional touch inputs may be less accessible or intuitive when the device is closed.

The physical arrangement of the image capture device on the exterior surface of the electronic device can even allow the image capture device to function as a sensor for detecting user interactions, such as taps or gestures, directly on the device's surface. This setup enables the electronic device to interpret these interactions as specific commands or control operations, enhancing the functionality of the electronic device without the need for additional hardware components.

Compared to existing solutions that rely on touchscreens or physical buttons, this method offers a more seamless and integrated approach to user interaction. The method provides more intuitive control, particularly in scenarios where the device is folded or closed, by utilizing the existing hardware in a multifunctional capacity. This approach not only simplifies the user interface but also reduces the need for additional input mechanisms, potentially lowering manufacturing costs and improving device durability.

In practical applications, this method can be used to unlock the device, navigate content, or control applications through simple gestures, providing a more efficient and user-friendly experience. For instance, a user could unlock their device by performing a specific gesture over the camera, or control media playback by tapping on the device's surface, all without needing to unfold the device or access a touchscreen. This enhances the usability of foldable devices, making them more versatile and appealing to users seeking innovative interaction methods.

In one or more embodiments, an electronic device comprises at least one image capture device, at least one display, and one or more processors operable with both the image capture device and the display. In one or more embodiments, the processors are configured to detect an object interacting with the image capture device in accordance with a user input motion by contacting a surface of the electronic device where the image capture device is situated.

Upon detecting such interaction, the processors perform a control operation associated with the user input motion. This configuration allows the image capture device to function beyond the traditional role of capturing images or video, serving instead as an interactive input mechanism that enhances user interface control. The integration of the image capture device as a multifunctional input tool provides a seamless and intuitive user experience, particularly beneficial in scenarios where conventional touch inputs may be less accessible or intuitive, such as when the device is in a closed position.

Advantageously, this configuration enables the image capture device to function as an interactive input mechanism, enhancing user interface control by utilizing existing hardware components. By detecting user input motions through the image capture device, the system offers an alternative interface for user interaction, which is particularly beneficial for foldable devices where traditional touch inputs may be less accessible or intuitive when the device is closed. This setup reduces the need for additional input mechanisms, potentially lowering manufacturing costs and improving device durability.

Additionally, integrating the image capture device as a multifunctional input tool provides a seamless and intuitive user experience, allowing for more efficient control of the device's functions. This approach not only simplifies the user interface but also enhances the device's functionality by leveraging the image capture device beyond the traditional role of capturing images or video.

In one or more embodiments, a method in an electronic device comprises detecting user input with an image capture device that remains exposed when a first device housing is pivotable about a hinge relative to a second device housing, transitioning between an axially displaced open position and a closed position. In one or more embodiments, this detection occurs while the first device housing is pivoted to the closed position, allowing the image capture device to capture interactions from an object, such as a user's finger, contacting the device's surface.

In one or more embodiments, the method further includes controlling content presented on a display, which is also exposed in both the open and closed positions, based on the detected user input. Advantageously, this configuration enables the electronic device to maintain functionality and user interaction capabilities even when in a closed state, enhancing the usability of foldable devices by allowing users to perform control operations without needing to unfold the device. The method may also include confirming the interaction by determining the distance between the device's surface and the object, ensuring accurate detection and response to user inputs.

Advantageously, this setup provides a seamless user experience by allowing users to interact with the device's interface through gestures or motions detected by the image capture device, even when the device is closed. This approach leverages the existing hardware to offer an alternative interaction method, reducing reliance on traditional touch inputs and potentially lowering manufacturing costs by minimizing the need for additional input mechanisms. The ability to control content without unfolding the device enhances the practicality and convenience of foldable devices, making them more appealing to users seeking efficient and intuitive interaction methods.

Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, a partially open position, shown and described below with reference to FIG. 3, and the open position shown in FIG. 1 where the first device housing 102 is in an axially displaced open position relative to the second device housing 103 about the hinge 101.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, the electronic device 100 will be bendable, but will not include a hinge 101, such as when the first device housing 102 and the second device housing 103 are manufactured from bendable materials. In still other embodiments, the electronic device 100 can be bendable via a combination of hinge components and non-hinge components.

Illustrating by example, in another embodiment the electronic device housing can exclude a hinge and instead be flexible with a bending region that allows the electronic device housing to bend and flex between the axially displaced open position and the closed position. In such an embodiment, the electronic device housing may be manufactured from a malleable, bendable, or physically deformable material such as a flexible thermoplastic, flexible composite material, flexible fiber material, flexible metal, organic or inorganic textile or polymer material, or other materials. The electronic device housing could be formed from a single flexible housing member or from multiple flexible housing members.

In other embodiments, the electronic device housing could be a composite of multiple components. For instance, in another embodiment the electronic device housing could be a combination of rigid segments connected by hinges or flexible materials. Still other constructs will be obvious to those of ordinary skill in the art having the benefit of this disclosure.

In one or more embodiments the electronic device 100 of FIG. 1 includes at least one display 105. The illustrative embodiment of FIG. 1 includes multiple displays. Display 105 serves as a first display and is also referred to as the interior display or the rear-facing display.

In this illustrative embodiment, display 105 is concealed when the first device housing 102 is pivoted about the hinge 101 relative to the second device housing 103 to a closed position. Illustrating by example, display 105 is concealed in FIG. 2 below.

Display 105 is then revealed when the first device housing 102 is pivoted about the hinge 101 relative to the second device housing 103 from the closed position to an axially displaced open position shown in FIG. 1. Thus, display 105 is revealed as the electronic device 100 transitions from the closed position of FIG. 2 to the open position of FIG. 1.

The electronic device 100 can optionally include at least one additional display. In the illustrative embodiment of FIG. 1, the electronic device 100 includes a front display 120, which can be referred to as an exterior display or front-facing display. This nomenclature regarding the "front facing display" and "rear facing display" arises due to the fact that the front display 120 is exposed both when the first device housing 102 and the second device housing 103 are pivoted about the hinge 101 to the closed position or the axially displaced open position. Thus, the front display 120 is exposed both in the axially displaced open position of FIG. 1 and the closed position of FIG. 2. In one or more embodiments, each of the rear display 105 and the front display 120 is a high-resolution display.

While shown coupled to the first device housing 102, it should be noted that the front display 120 could be coupled to either of the first device housing 102 or the second device housing 103. In other embodiments, the front display 120 can be coupled to the first device housing 102, while a third display (not shown) is coupled to the second device housing 103, and so forth. Thus, electronic devices configured in accordance with embodiments of the disclosure can include displays situated at different positions.

As with the front display 120, display 105 can also be coupled to either or both of the first device housing 102 or the second device housing 103. In this illustrative embodiment, display 105 is coupled to both the first device housing 102 and the second device housing 103 and spans the hinge 101. As noted above, display 105 is considered to be an "interior" display because it is concealed when the first device housing 102 and the second device housing 103 are in the closed position.

In one or more embodiments, either or both of display 105 and front display 120 can be touch-sensitive. Where this is the case, users can deliver user input to one or both of display 105 or the front display 120 by delivering touch input from a finger, stylus, or other objects disposed proximately with display 105 or the front display 120.

In the illustrative embodiment of FIG. 1, since display 105 spans the hinge 101, it is configured as a flexible display that can bend, deflect, and deform into different shapes. For instance, in one embodiment display 105 is configured as a foldable organic light emitting diode (OLED) display coupled to a foldable substrate.

The foldable substrate can be manufactured from various materials, including flexible plastic layers, flexible metal layers, flexible composite layers, or of other materials. In one embodiment, the foldable substrate is manufactured from stainless steel. Others will be obvious to those of ordinary skill in the art having the benefit of this disclosure. Where manufactured with a foldable substrate, this substrate allows display 105 to be flexible so as to deform when the first device housing 102 pivots about the hinge 101 relative to the second device housing 103.

In one or more embodiments, a user interface component 108, which may be a button or touch sensitive surface, can also be disposed along one or both of the first device housing 102 and/or the second device housing 103 to facilitate control of the electronic device 100. In the illustrative embodiment of FIG. 1, the user interface component 108 comprises a button positioned on the second device housing 103. In other embodiments, the user interface component will be placed on the side of the first device housing 102 or second device housing 103, or to the side of front display 120. In still other embodiments, such as when the user interface component 108 is configured as a fingerprint sensor, it may be placed beneath the front facing display 120. Other locations for the user interface component 108 will be obvious to those of ordinary skill in the art having the benefit of this disclosure.

Other features can be added and can be located on the front of one or both of the first device housing 102 and/or the second device housing 103, sides of one or both of the first device housing 102 and/or the second device housing 103, and/or the rear of one or both of the first device housing 102 and/or the second device housing 103. Illustrating by example, in one or more embodiments a first image capture device 106 can be disposed on one side of the electronic device 100, while a second image capture device 125 is disposed on another side of the electronic device 100.

In the illustrative embodiment of FIG. 1, the first image capture device 106 and a third image capture device 107 are disposed on a front-facing side of the first device housing 102, while the second image capture device 125 is situated on a rear-facing side of the first device housing 102. As shown in FIG. 1, in this illustrative embodiment the front facing display 120 has a display perimeter that is defined by the outermost boundary of the area occupied by the front facing display 120 on the second device housing 103. In this illustrative embodiment, the first image capture device 106 and the third image capture device 107 are situated within this display perimeter.

In one or more embodiments, the first image capture device 106 and the third image capture device 107 can be different types of image capture devices. Illustrating by example, the first image capture device 106 may be a wide field of view image capture device, while the third image capture device 107 is a telephoto image capture device, and so forth. In one or more embodiments, the first image capture device 106 and the third image capture device 107 can be used to capture images of front-facing subjects, while the second image capture device 125 can be used for rear-facing subjects, such as when a user of the electronic device 100 is capturing a "selfie."

In other embodiments, the first image capture device 106 and the third image capture device 107 could be positioned beneath the front facing display 120. Illustrating by example, in such an embodiment the front facing display 120 may comprise a first pixel portion and a second pixel portion. In one embodiment, the first pixel portion comprises only transparent organic light emitting diode pixels. In another embodiment, the pixels disposed in the first pixel portion comprise a combination of transparent organic light emitting diode pixels and reflective organic light emitting diode pixels. Other configurations will be obvious to those of ordinary skill in the art having the benefit of this disclosure.

In such an embodiment, the entire extent of the front facing display 120 would be available for presenting images. In the illustrative embodiment of FIG. 1, the first image capture device 106 and the third image capture device 107 are situated within apertures defined by the extent of the front facing display 120 within the outer display perimeter. As such, content is not presented within the outer perimeters of the first image capture device 106 and the third image capture device 107. This configuration allows for lenses and other components to be situated atop the image sensors of each of the first image capture device 106 and the third image capture device 107.

While some borders are shown in FIG. 1, in other embodiments there is no need for the first device housing 102 of the electronic device 100 to include borders that picture frame the front facing display 120 or the rear facing display 105. To the contrary, in other embodiments one or both of the rear facing display 105 and/or the front facing display 120 can span an entire major face of the electronic device 100 so that the entirety of the major face can be used as active display area.

One way that the amount of surface area of the first device housing 102 and the second device housing 103 covered by the rear display 105 or the front display 120 can be expanded is by placing the various sensors, e.g., image capture devices and the fingerprint sensor, beneath the first pixel portion of a display as previously described. This allows the fingerprint sensor, the image capture devices, and/or the other sensors to receive signals through the transparent portions of the first pixel portion.

A block diagram schematic 104 of the electronic device 100 is also shown in FIG. 1. In one or more embodiments, the block diagram schematic 104 is configured as a printed circuit board assembly disposed within one or both of the first device housing 102 or the second device housing 103. Various components can be electrically coupled together by conductors or a bus disposed along one or more printed circuit boards, which can optionally be flexible circuit boards or alternatively rigid circuit boards coupled together by one or more flexible conductors or substrates. It should be noted that the block diagram schematic 104 includes many components that are optional, but which are included in an effort to demonstrate how varied electronic devices configured in accordance with embodiments of the disclosure can be.

Thus, it is to be understood that the block diagram schematic 104 of FIG. 1 is provided for illustrative purposes only and for illustrating components of one electronic device 100 in accordance with embodiments of the disclosure. The block diagram schematic 104 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components and still be within the scope of the present disclosure.

In one embodiment, the electronic device 100 includes one or more processors 109. The one or more processors 109 can be a microprocessor, a group of processing components, one or more Application Specific Integrated Circuits (ASICs), programmable logic, or other type of processing device. The one or more processors 109 can be operable with the various components of the electronic device 100. The one or more processors 109 can be configured to process and execute executable software code to perform the various functions of the electronic device 100. A storage device, such as memory 110, can optionally store the executable software code used by the one or more processors 109 during operation.

In one or more embodiments, the one or more processors 109 are responsible for utilizing one or both of the first image capture device 106 and/or the third image capture device 107 as a user interface control. Illustrating by example, in one or more embodiments the one or more processors 109 use signals from one or both of the first image capture device 106 and/or the third image capture device 107 to detect an object, such as a user's finger, interacting with one or both of the first image capture device 106 and/or the third image capture device 107.

In one or more embodiments, when the one or more processors 109 detect an object interacting with one or both of the first image capture device 106 and/or the third image capture device 107 in accordance with a user input motion by contacting a surface of the electronic device 100 where one or both of the first image capture device 106 and/or the third image capture device 107 are situated, the one or more processors 109 perform, in response to the object interacting with one or both of the first image capture device 106 and/or the third image capture device 107, a control operation associated with the user input motion.

Illustrating by example, if the user input motion defines a predetermined pattern, the control operation may unlock the electronic device 100. This allows one or both of the first image capture device 106 and/or the third image capture device 107 to be used as a track pad. The user can make predefined pattern with a finger atop a one or both of the first image capture device 106 and/or the third image capture device 107 to unlock the electronic device 100.

In other embodiments, if content is being presented, for example, on the front facing display 120 when the first device housing 102 is pivoted about the hinge 101 relative to the second device housing 103 to the closed position, the control operation may control the content in accordance with its motion. If, for example, the user input motion is substantially linear, the control operation may scroll the content in accordance with the direction of the user input motion. Similarly, if the content comprises a game, the user input motion may control the game, and so forth.

Figure 2:
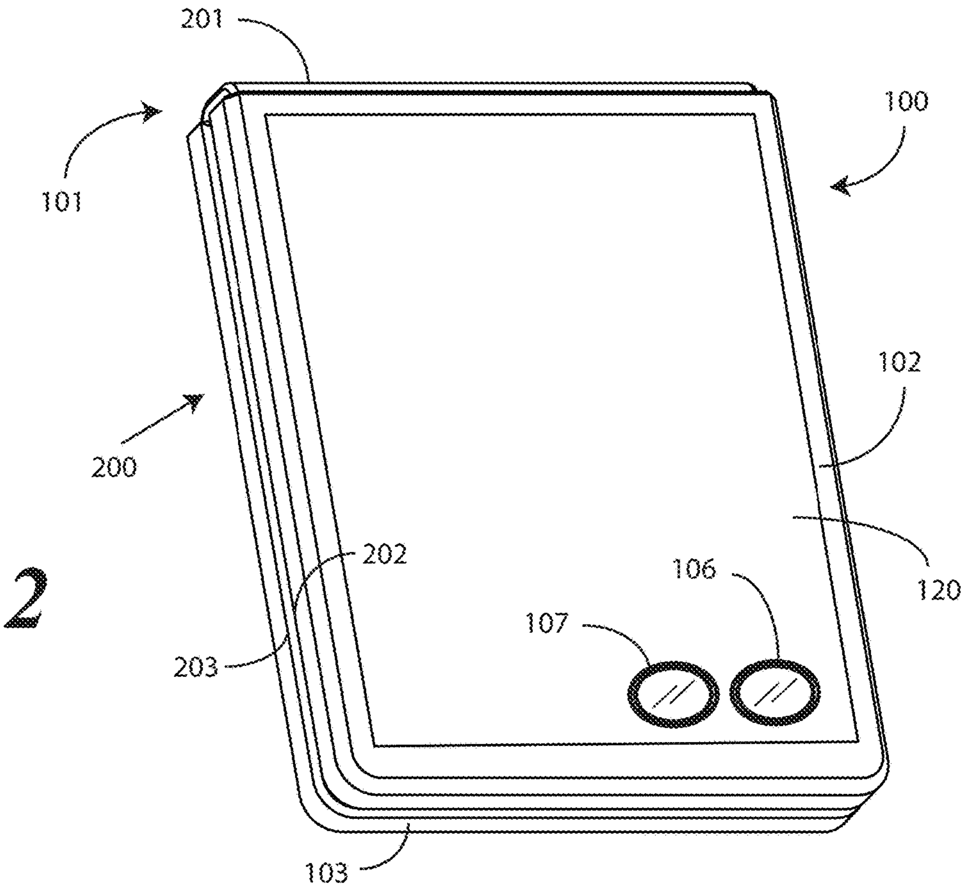
FIG. 2 illustrates the explanatory electronic device of FIG. 1 in a closed position.

It should be noted that in this illustrative embodiment both of the first image capture device 106 and the third image capture device 107 are coupled to the first device housing 102 and are each exposed both when the first device housing 102 and the second device housing 103 are in the closed position, as shown in FIG. 2 below, and when the first device housing 102 and the second device housing 103 are in the axially displaced open position of FIG. 1. Embodiments of the disclosure contemplate that when the electronic device 100 is in the axially displaced open position, users will typically use the rear facing display 105 as a user interface since the rear facing display 105 is generally a touch-sensitive display.

Accordingly, in one or more embodiments the one or more processors 109 are configured to perform, in response to an object interacting with one or both of the first image capture device 106 and/or the third image capture device 107, a control operation associated with the user input motion of the interaction only when the electronic device 100 is in the closed position. In other embodiments, the control operation can be performed even when the electronic device 100 is in the axially displaced open position so that, for example, a user can control a cursor on the rear facing display 105 using one or both of the first image capture device 106 and/or the third image capture device 107, thereby eliminating the need to block visible content presented on the rear facing display 105 with a finger and/or hand when delivering user input to the rear facing display 105.

In one or more embodiments, the one or more processors 109 are further responsible for performing the primary functions of the electronic device 100. For example, in one embodiment the one or more processors 109 comprise one or more circuits operable to present presentation information, such as images, text, and video, on one or both of the rear facing display 105 and/or the front facing display 120. The executable software code used by the one or more processors 109 can be configured as one or more modules 113 stored in the memory 110 that are operable with the one or more processors 109. Such modules can store instructions, control algorithms, and so forth.

In one embodiment, the one or more processors 109 are responsible for running the operating system environment 114. The operating system environment can include a kernel 115, one or more drivers, and an application service layer 116, and an application layer 117. The operating system environment can be configured as executable code operating on one or more processors or control circuits of the electronic device 100.

In one or more embodiments, the one or more processors 109 are responsible for managing the applications of the electronic device 100. In one or more embodiments, the one or more processors 109 are also responsible for launching, monitoring and killing the various applications and the various application service modules. The applications of the application layer can be configured as clients of the application service layer to communicate with services through application program interfaces (APIs), messages, events, or other inter-process communication interfaces.

In this illustrative embodiment, the electronic device 100 also includes a communication device 118 that can be configured for wired or wireless communication with one or more other devices or networks. The networks can include a wide area network, a local area network, and/or personal area network. The communication device 118 may also utilize wireless technology for communication, such as, but are not limited to, peer-to-peer or ad hoc communications, and other forms of wireless communication such as infrared technology. The communication device 118 can include wireless communication circuitry, one of a receiver, a transmitter, or transceiver, and one or more antennas 119.

In one embodiment, the electronic device 100 includes one or more sensors 124 operable to determine a geometric form factor of the electronic device 100. Illustrating by example, in one or more embodiments the one or more sensors 124 operable to detect the geometric form factor of the electronic device 100 detect angles between the first device housing 102 and the second device housing 103 as these device housings pivot relative to each other about the hinge 101. The one or more sensors 124 operable to determine a geometric form factor of the electronic device 100 can detect the first device housing 102 pivoting about the hinge 101 relative to the second device housing 103. The one or more sensors 124 operable to determine the geometric form factor can take various forms.

In one or more embodiments, the one or more sensors 124 operable to determine the geometric form factor of the electronic device 100 comprise one or more flex sensors supported by the first device housing 102 and/or second device housing 103 and operable with the one or more processors 109 to detect a bending operation deforming the electronic device 100 into a deformed geometric form factor, examples of which are shown below in FIGS. 2 and 3. The inclusion of flex sensors is optional, and in some embodiment flex sensors will not be included.

Where included, in one embodiment the flex sensors each comprise passive resistive devices manufactured from a material with an impedance that changes when the material is bent, deformed, or flexed. By detecting changes in the impedance as a function of resistance, the one or more processors 109 can use the one or more flex sensors to detect bending or flexing. In one or more embodiments, each flex sensor comprises a bi-directional flex sensor that can detect flexing or bending in two directions. In one embodiment, the one or more flex sensors have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors 109 can detect this change to determine an amount of bending. Taps can be added along each flex sensor to determine other information, including the number of folds, the degree of each fold, the location of the folds, the direction of the folds, and so forth. The flex sensor can further be driven by time-varying signals to increase the amount of information obtained from the flex sensor as well.

While a multi-layered device as a flex sensor is one configuration suitable for detecting a bending operation occurring to deform the electronic device 100 and a geometric form factor of the electronic device 100 after the bending operation, other sensors 124 for detecting the geometric form factor of the electronic device 100 can be used as well. For instance, a magnet can be placed in the first device housing 102 while a magnetic sensor is placed in the second device housing 103, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more sensors 124 operable to determine a geometric form factor of the electronic device 100 can comprise an inductive coil placed in the first device housing 102 and a piece of metal placed in the second device housing 103, or vice versa. When the metal is in close proximity to the coil, the one or more sensors 124 operable to determine the geometric form factor of the electronic device 100 detect the first device housing 102 and the second device housing 103 in a first position. By contrast, when the metal is farther away from the coil, the one or more sensors 124 operable to determine a geometric form factor of the electronic device 100 can detect the first device housing 102 and the second device housing 103 being in a second position, and so forth.

In other embodiments the one or more sensors 124 operable to determine a geometric form factor of the electronic device 100 can comprise an inertial motion unit situated in the first device housing 102 and another inertial motion unit situated in the second device housing 103. The one or more processors 109 can compare motion sensor readings from each inertial motion unit to track the relative movement and/or position of the first device housing 102 relative to the second device housing 103, as well as the first device housing 102 and the second device housing 103 relative to the direction of gravity. This data can be used to determine and or track the state and position of the first device housing 102 and the second device housing 103 directly as they pivot about the hinge 101, as well as their orientation with reference to a direction of gravity.

Where included as the one or more sensors 124 operable to determine the geometric form factor of the electronic device 100, each inertial motion unit can comprise a combination of one or more accelerometers, one or more gyroscopes, and optionally one or more magnetometers, to determine the orientation, angular velocity, and/or specific force of one or both of the first device housing 102 or the second device housing 103. When included in the electronic device 100, these inertial motion units can be used as orientation sensors to measure the orientation of one or both of the first device housing 102 or the second device housing 103 in three-dimensional space. Similarly, the inertial motion units can be used as orientation sensors to measure the motion of one or both of the first device housing 102 or second device housing 103 in three-dimensional space. The inertial motion units can be used to make other measurements as well.

Where only one inertial motion unit is included in the first device housing 102, this inertial motion unit is configured to determine an orientation, which can include measurements of azimuth, plumb, tilt, velocity, angular velocity, acceleration, and angular acceleration, of the first device housing 102. Similarly, where two inertial motion units are included, with one inertial motion unit being situated in the first device housing 102 and another inertial motion unit being situated in the second device housing 103, each inertial motion unit determines the orientation of its respective device housing. Inertial motion unit can determine measurements of azimuth, plumb, tilt, velocity, angular velocity, acceleration, angular acceleration, and so forth of the first device housing 102, while inertial motion unit can determine measurements of azimuth, plumb, tilt, velocity, angular velocity, acceleration, angular acceleration, and so forth of the second device housing 103, and so forth.

In one or more embodiments, each inertial motion unit delivers these orientation measurements to the one or more processors 109 in the form of orientation determination signals. Thus, the inertial motion unit situated in the first device housing 102 outputs a first orientation determination signal comprising the determined orientation of the first device housing 102, while the inertial motion unit situated in the second device housing 103 outputs another orientation determination signal comprising the determined orientation of the second device housing 103.

In one or more embodiments, the orientation determination signals are delivered to the one or more processors 109, which report the determined orientations to the various modules, components, and applications operating on the electronic device 100. In one or more embodiments, the one or more processors 109 can be configured to deliver a composite orientation that is an average or other combination of the orientation of orientation determination signals. In other embodiments, the one or more processors 109 are configured to deliver one or the other orientation determination signal to the various modules, components, and applications operating on the electronic device 100.

In another embodiment the one or more sensors 124 operable to determine the geometric form factor of the electronic device 100 comprise proximity sensors that detect how far a first end of the electronic device 100 is from a second end of the electronic device 100. Still other examples of the one or more sensors 124 operable to determine a geometric form factor of the electronic device 100 will be obvious to those of ordinary skill in the art having the benefit of this disclosure.

In one or more embodiments, the one or more sensors 124 operable to determine the geometric form factor of the electronic device 100 can comprise an image capture analysis/synthesis manager. When the electronic device 100 is bent at the hinge 101 with, for example, the rear facing image capture device 125 determining the geometric form factor by processing images from the rear facing image capture device 125 to determine the angle of the bend.

In one or more embodiments, one or more of the first image capture device 106, the second image capture device 125, and the third image capture device 107 comprise an intelligent imager. Where configured as an intelligent imager, each image capture device 106,107,125 can capture one or more images of environments about the electronic device 100 and determine whether the object matches predetermined criteria.

For example, the intelligent imager operates as an identification module configured with optical recognition such as include image recognition, character recognition, visual recognition, facial recognition, color recognition, shape recognition and the like. In yet another embodiment, the intelligent imager can determine where a user's eyes or face are located in three-dimensional space relative to the electronic device 100.

In addition to, or instead of the intelligent imager, one or more proximity sensors included with the other sensors 124 can determine to which side of the electronic device 100 the user is positioned when the electronic device 100 is deformed. The proximity sensors can include one or more proximity sensor components. The proximity sensors can also include one or more proximity detector components. In one embodiment, the proximity sensor components comprise only signal receivers. By contrast, the proximity detector components include a signal receiver and a corresponding signal transmitter.

In one embodiment, the proximity sensor components comprise an infrared signal receiver so as to be able to detect infrared emissions from a person. Accordingly, the proximity sensor components require no transmitter since objects disposed external to the electronic device 100 deliver emissions that are received by the infrared receiver. As no transmitter is required, each proximity sensor component can operate at a very low power level.

In one embodiment, one or more proximity detector components can each include a signal receiver and a corresponding signal transmitter. The signal transmitter can transmit a beam of infrared light that reflects from a nearby object and is received by a corresponding signal receiver. The proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more processors 109 may generate commands or execute control operations based on information received from the various sensors 124 and other components 123, including the one or more sensors 124 operable to determine the geometric form factor of the electronic device 100, the first image capture device 106, the second image capture device 125, or other components of the electronic device. The one or more processors 109 may also generate commands or execute control operations based upon information received from a combination of these components. Moreover, the one or more processors 109 may process the received information alone or in combination with other data, such as the information stored in the memory 110.

The other sensors 124 and other components 123 may include a microphone, an earpiece speaker, a loudspeaker, key selection sensors, a touch pad sensor, a touch screen sensor, a capacitive touch sensor, and one or more switches. Touch sensors may be used to indicate whether any of the user actuation targets present on the rear display 105 are being actuated. Alternatively, touch sensors can determine if the front display 120 is being touched to determine whether fingerprint data is being delivered to the fingerprint sensor. The touch sensors can include surface and/or housing capacitive sensors in one embodiment.

The other sensors 124 and components 123 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion. In one embodiment the motion detectors are also operable to detect movement, and direction of movement, of the electronic device 100 by a user.

In one or more embodiments, the other sensors 124 and components 123 include a gravity detector. For example, as one or more accelerometers and/or gyroscopes may be used to show vertical orientation, constant, or a measurement of tilt relative to gravity. Accordingly, in one or more embodiments, the one or more processors 109 can use the gravity detector to determine an orientation of the electronic device 100 in three-dimensional space relative to the direction of gravity.

The other sensors 124 and components 123 operable with the one or more processors 109 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components and still be within the scope of the present disclosure.

Turning now to FIG. 2, illustrated therein is the electronic device 100 in a closed state. In this state, the first device housing 102 has been pivoted about the hinge assembly 101 toward the second device housing 103 to a closed position 200. When in the closed position 200, a front surface 202 of the first device housing 102 abuts a front surface 203 of the second device housing 103. Note that the front facing display 120 and the first image capture device 106 and third image capture device 107 are exposed in the closed position 200.

Additionally, in this illustrative embodiment, a hinge housing 201 comprising the hinge of the hinge assembly 101 is revealed when the electronic device 100 is in the closed position 200. In other embodiments, the hinge housing 201 will remain concealed when the first device housing 102 pivots about the hinge assembly 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing

102 and the second device housing 103 to retain the first device housing 102 and the second device housing 103 in the closed position 200.

In still other embodiments, frictional elements can be incorporated into the hinge assembly 101 to retain the first device housing 102 and the second device housing 103 in a particular position. A stator motor could be integrated into the hinge assembly 101 as well. Still other mechanical structures and devices suitable for retaining the electronic device 100 in the closed position 200 will be obvious to those of ordinary skill in the art having the benefit of this disclosure. As will be described below, in other embodiments retention devices can be omitted due to the fact that torsion springs used in combination with a cam having mechanical detents and a stator with mechanical protrusions are used.

Figure 3:
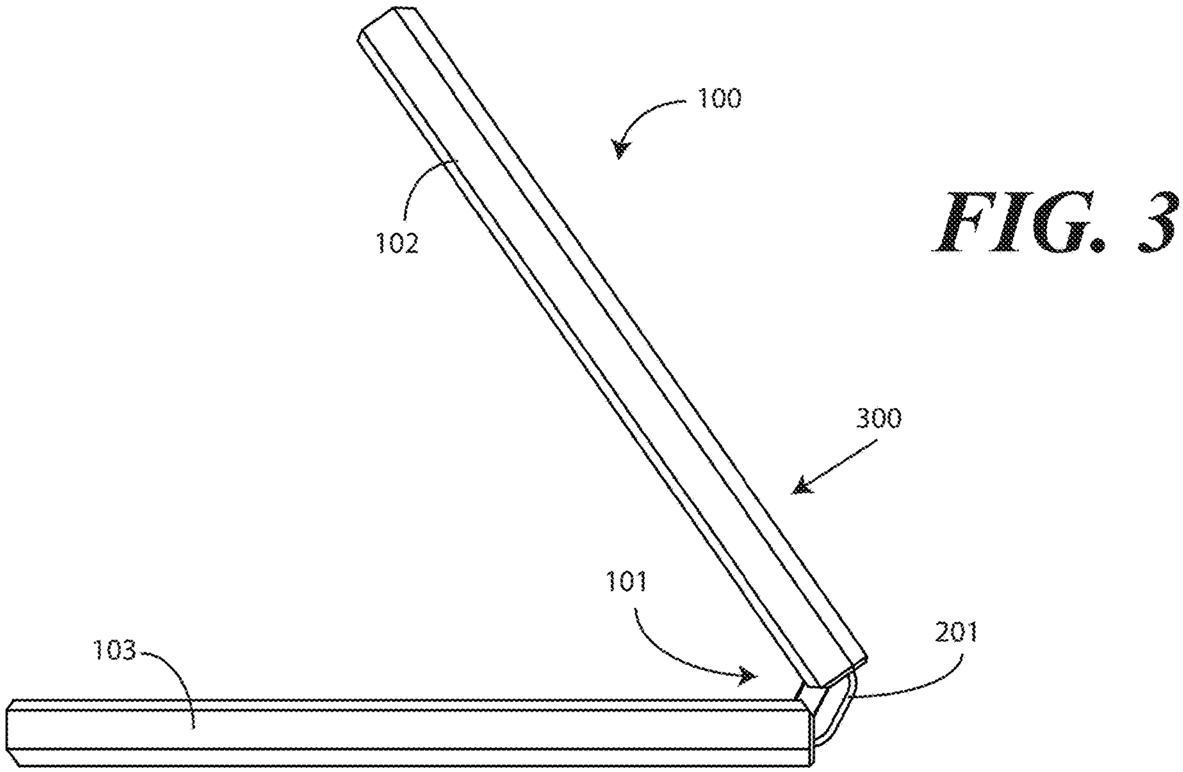
FIG. 3 illustrates the explanatory electronic device of FIG. 1 in a partially folded position.

Turning now to FIG. 3, the electronic device 100 is shown being transitioned from the closed position (200) of FIG. 2 to a partially open position 300. Specifically, the first device housing 102 is pivoting about the hinge assembly 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figure 4:
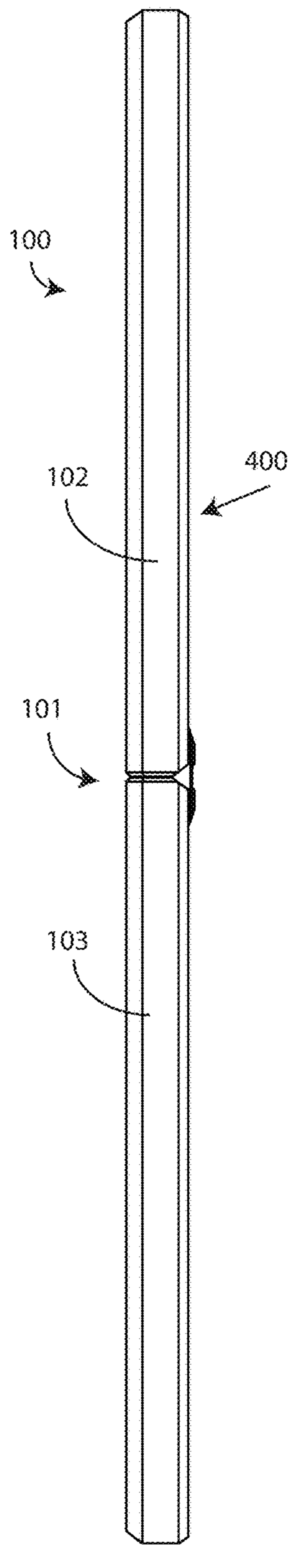
FIGS. 4-5 illustrate the explanatory electronic device of FIG. 1 in an axially displaced open position.
Figure 5:
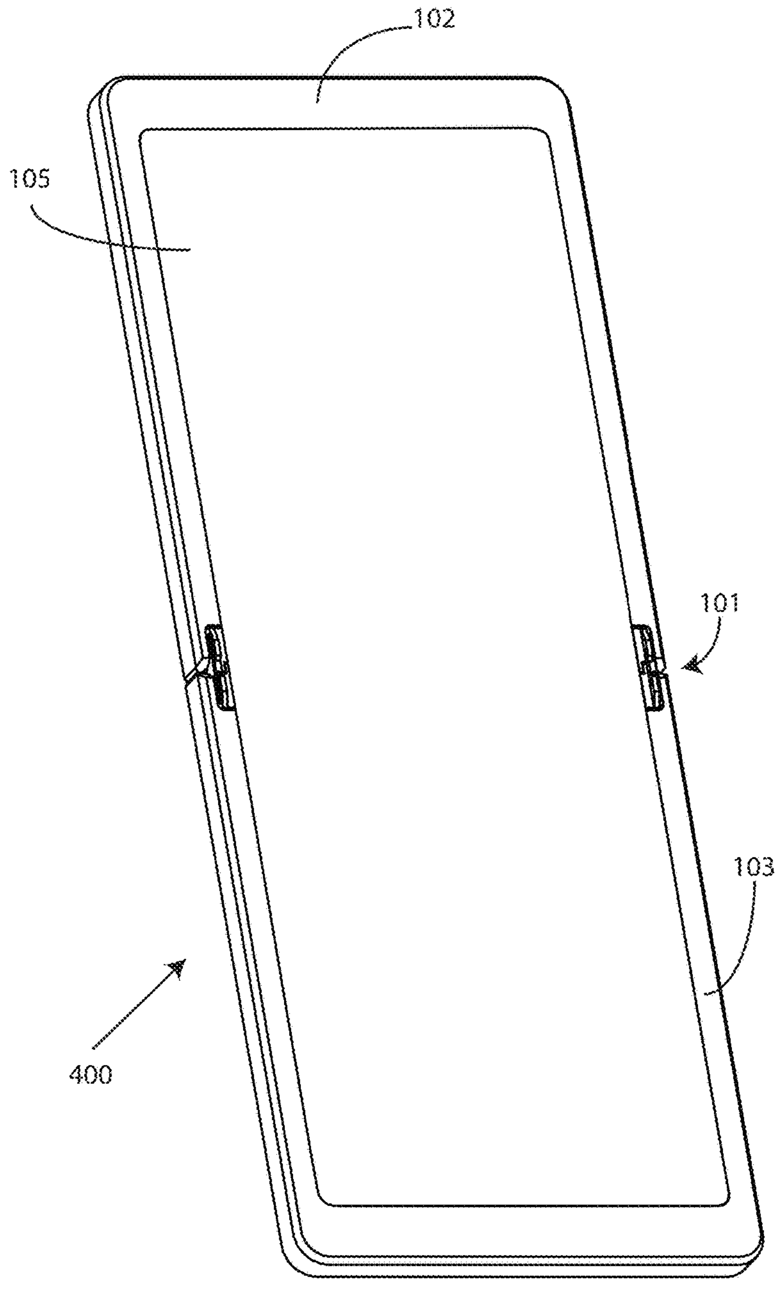

Turning now to FIGS. 4 and 5, illustrated therein is the electronic device 100 in an axially displaced open position 400. In the axially displaced open position 400, the first device housing 102 is rotated about the hinge assembly 101 so as to be axially displaced 180-degrees out of phase with the second device housing 103, thereby revealing the rear facing display 105 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display as the rear facing display 105, the flexible display has been elongated into a flat position.

Figure 6:
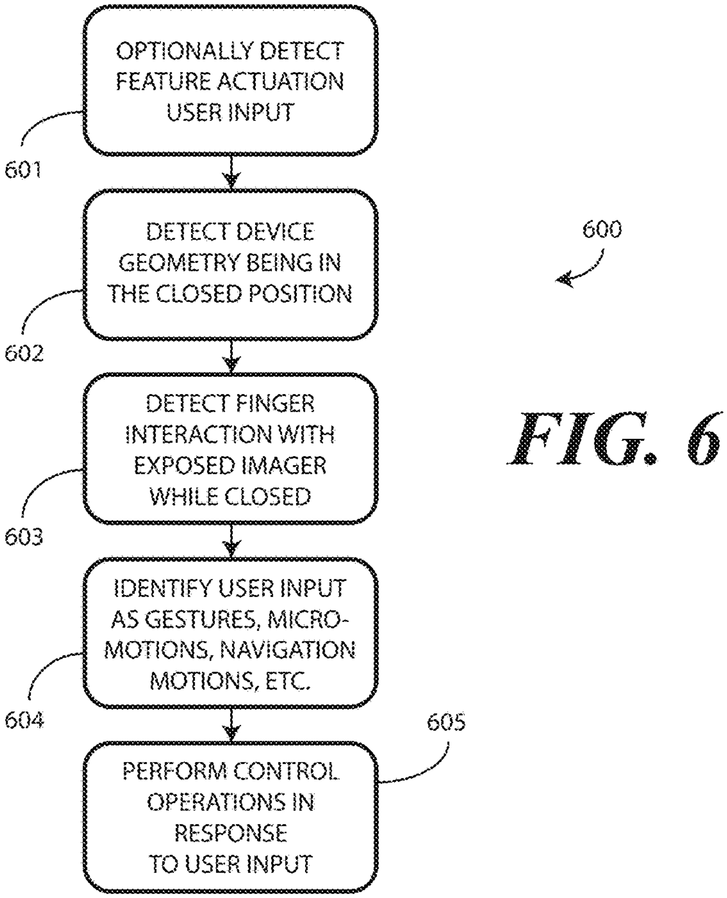
FIG. 6 illustrates one explanatory method in accordance with one or more embodiments of the disclosure.

Turning now to FIG. 6, illustrated therein is one explanatory method 600 in accordance with one or more embodiments of the disclosure. In one or more embodiments, the method 600 detects, with an image capture device of the electronic device, an object contacting an exterior surface of the electronic device at a location where the image capture device is situated and interacting with image capture device at the location in accordance with a predefined user input motion. In one or more embodiments, the method 600 correlates, by one or more processors operable with the image capture device, the predefined user input motion with a control operation. In one or more embodiments, the method 600 performs, by the one or more processors, the control operation in response to the interaction of the object with the image capture device.

Embodiments of the disclosure contemplate that a user may not always want to use their imager as a user interface control device. For instance, some users may simply want to use the image capture device as just that—a device to capture images—even when the electronic device is closed. Accordingly, optional step 601 provides a way for a user to actuate the "camera as a button feature."

In one or more embodiments, optional step 601 comprises detecting, by one or more sensors of the electronic device, other user input transitioning the image capture device to a user interface control mode of operation prior to performing any control operation in response to the interaction of an object with the image capture device. Embodiments of the disclosure contemplate that requiring user input to transition an image capture device to a user interface control mode of operation prior to performing control operations in response to user input interacting with the image capture device, as outlined in step 601 of method 600 in FIG. 6 where this step 601 is included in the method 600, offers several advantages.

Illustrating by example, where included this requirement acts as a safeguard against unintended activations, ensuring that the image capture device does not inadvertently interpret incidental contact or environmental factors as deliberate user input. By necessitating a specific action to enable the control mode, the system can more accurately distinguish between intentional user interactions and accidental touches, thereby enhancing the reliability and precision of the device's response to user commands.

This approach also allows users to maintain the traditional functionality of the image capture device when desired, providing flexibility and control over the device's operation. As a result, this method enhances the overall user experience by reducing the likelihood of erroneous operations and allowing for a more intuitive and user-friendly interface.

Figure 9:
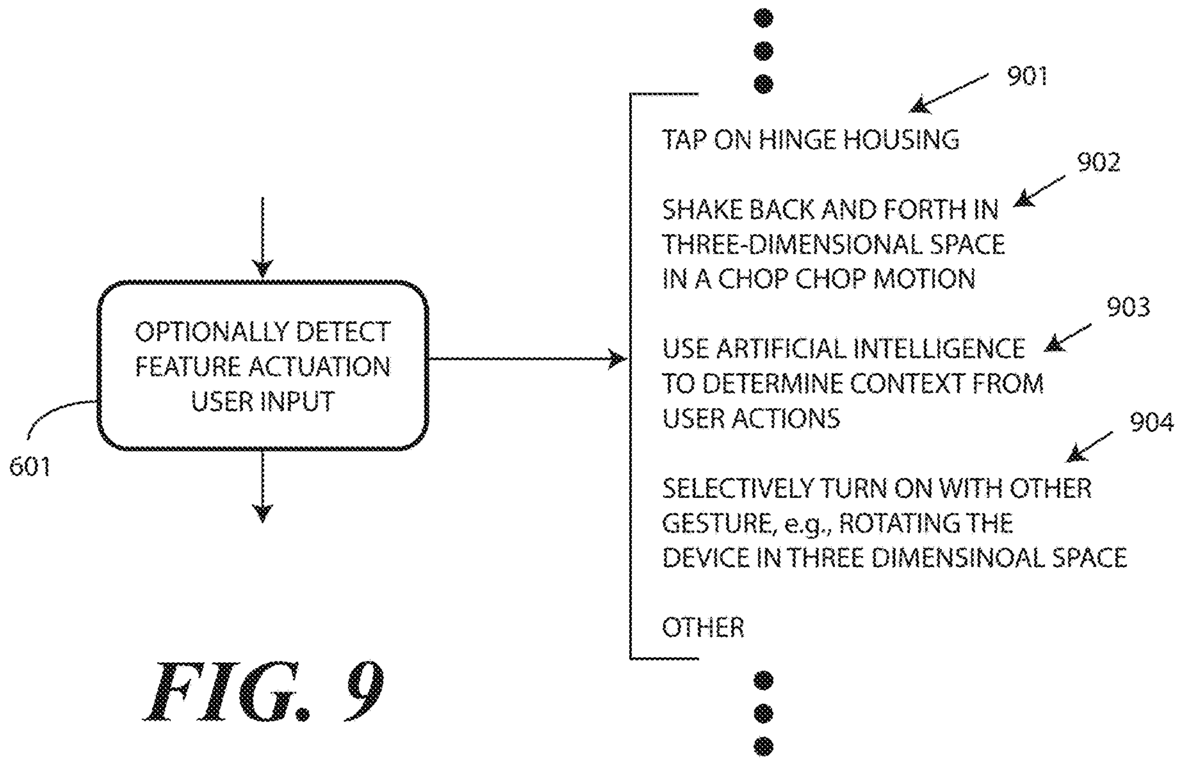
FIG. 9 illustrates one or more method steps in accordance with one or more embodiments of the disclosure.

Step 601 can take a variety of forms. Turning now briefly to FIG. 9, illustrated therein are a few. Others will be obvious to those of ordinary skill in the art having the benefit of this disclosure.

In one or more embodiments, as illustrated in step 601 of FIG. 9, the user input required to transition an image capture device to a user interface control mode of operation can comprise a tapping gesture 901 on a hinge housing situated between a first device housing and a second device housing. As described above with reference to FIG. 2-5, in one or more embodiments the hinge housing allows the first and second device housings to transition between an axially displaced open position and a closed position.

Embodiments of the disclosure contemplate that the use of a tapping gesture 901 is beneficial as it provides a simple and intuitive method for users to activate the user interface control mode of one or more image capture devices without needing to unfold the device, thereby enhancing the convenience and efficiency of user interactions with the device. To detect such a tapping gesture 901, the electronic device may incorporate accelerometer sensors strategically positioned within the hinge housing.

In one or more embodiments, these sensors are capable of detecting the specific vibration patterns associated with a tapping gesture 901, distinguishing them from other types of motion or environmental vibrations. Additionally, the device may utilize proximity sensors to confirm the presence of a user's hand near the hinge housing, ensuring that the detected gesture is intentional.

The integration of these hardware components not only allows for accurate detection of the tapping gesture but also minimizes false activations, thereby improving the reliability and user experience of the device. The accelerometer sensors provide precise motion detection, while the proximity sensors add an additional layer of verification, collectively offering a robust solution for gesture-based control activation.

In other embodiments, at step 601 the user input required to transition an image capture device to a user interface control mode of operation can comprise moving the electronic device up and down in three-dimensional space in a chop-chop motion 902. The use of a chop-chop motion 902 is beneficial as it provides a simple and intuitive gesture that can be easily performed by users without requiring visual confirmation, thereby enhancing the convenience and efficiency of user interactions with the device.

To detect such a chop-chop motion 902, the electronic device may incorporate accelerometer sensors strategically positioned within the device's housing. These sensors are capable of detecting rapid changes in acceleration and direction, distinguishing the chop-chop motion from other types of movement or environmental vibrations.

Additionally, the device may utilize gyroscopic sensors to confirm the rotational stability of the device during the motion, ensuring that the detected gesture is intentional. The integration of these hardware components not only allows for accurate detection of the chop-chop motion but also minimizes false activations, thereby improving the reliability and user experience of the device. The accelerometer sensors provide precise motion detection, while the gyroscopic sensors add an additional layer of verification, collectively offering a robust solution for gesture-based control activation.

At step 601 of FIG. 9, artificial intelligence 903 may be employed to detect the context of the electronic device, thereby transitioning an image capture device to a user interface control mode of operation. This intelligent context detection allows the device to autonomously determine when a user intends to use the image capture device as an input mechanism, enhancing the user experience by reducing the need for manual mode switching.

For instance, in a use case where content is being presented on a front-facing display, artificial intelligence 903 can analyze user behavior patterns, such as the frequency and type of interactions with the display, to infer that the user wishes to scroll through the content. In response, the system can automatically activate the image capture device as a control interface, allowing the user to perform scrolling actions through gestures detected by the camera.

Another use case involves a scenario where a game is being displayed on the front-facing display. Here, artificial intelligence 903 can recognize the gaming context by detecting specific game-related visual cues or user engagement levels. As a result, the system can transition the image capture device to a control mode, enabling the user to manipulate game characters through predefined gestures, such as swipes or taps, captured by the camera. These use cases illustrate the versatility and adaptability of artificial intelligence 903 in enhancing user interaction with foldable electronic devices.

At step 601 of FIG. 9, in one or more embodiments, the user input required to transition an image capture device to a user interface control mode of operation can comprise a user-defined gesture 904, such as twisting the electronic device while content is being presented on the front-facing display. The use of a user-defined gesture 904 is beneficial as it allows users to customize their interaction with the device, providing a more personalized and intuitive user experience. This flexibility can enhance user satisfaction by enabling gestures that are natural and comfortable for the individual user.

To detect such a user-defined gesture 904, the electronic device may incorporate a combination of accelerometers and gyroscopes strategically positioned within the device's housing. Accelerometers can detect changes in linear motion, while gyroscopes can measure the angular velocity of the device, allowing the system to accurately interpret the twisting motion. Additionally, the integration of magnetometers can further refine the detection by providing orientation data relative to the Earth's magnetic field, enhancing the precision of gesture recognition. These hardware components collectively offer a robust solution for detecting complex gestures, minimizing false activations, and ensuring reliable performance, thereby improving the overall functionality and user experience of the electronic device.

Turning now back to FIG. 6, at optional step 602 one or more processors of an electronic device determine that a first device housing of the electronic device has been pivoted relative to a second device housing about a hinge to a closed position. As noted above, in certain scenarios a user may prefer to utilize an exposed image capture device as a user interface control device specifically when the electronic device is in a closed position due to the enhanced convenience and efficiency offered.

When the device is closed, traditional touch inputs on the main display are inaccessible, making it cumbersome to perform quick interactions or access frequently used functions. By leveraging the image capture device as a control mechanism, users can execute predefined gestures or motions to perform control operations without the need to unfold the device, thereby streamlining the interaction process.

This approach not only preserves the compact form factor of the foldable device but also allows for intuitive control over the device's functions, such as unlocking the device, navigating content, or controlling media playback, all while maintaining the device in a closed state. This functionality is particularly advantageous in situations where the user requires rapid access to certain features or when the device is being used in a manner that does not necessitate full screen interaction, thus enhancing the overall user experience by providing a seamless and efficient method of interaction.

Accordingly, in one or more embodiments the one or more processors are configured to perform, at step 605 in response to the object interacting with the at least one image capture device, the control operation associated with the user input motion only when the electronic device is in the closed position. Where this is the case, step 602 first confirms that the electronic device is in the closed position prior to user input being detected interacting with an image capture device.

Figure 10:
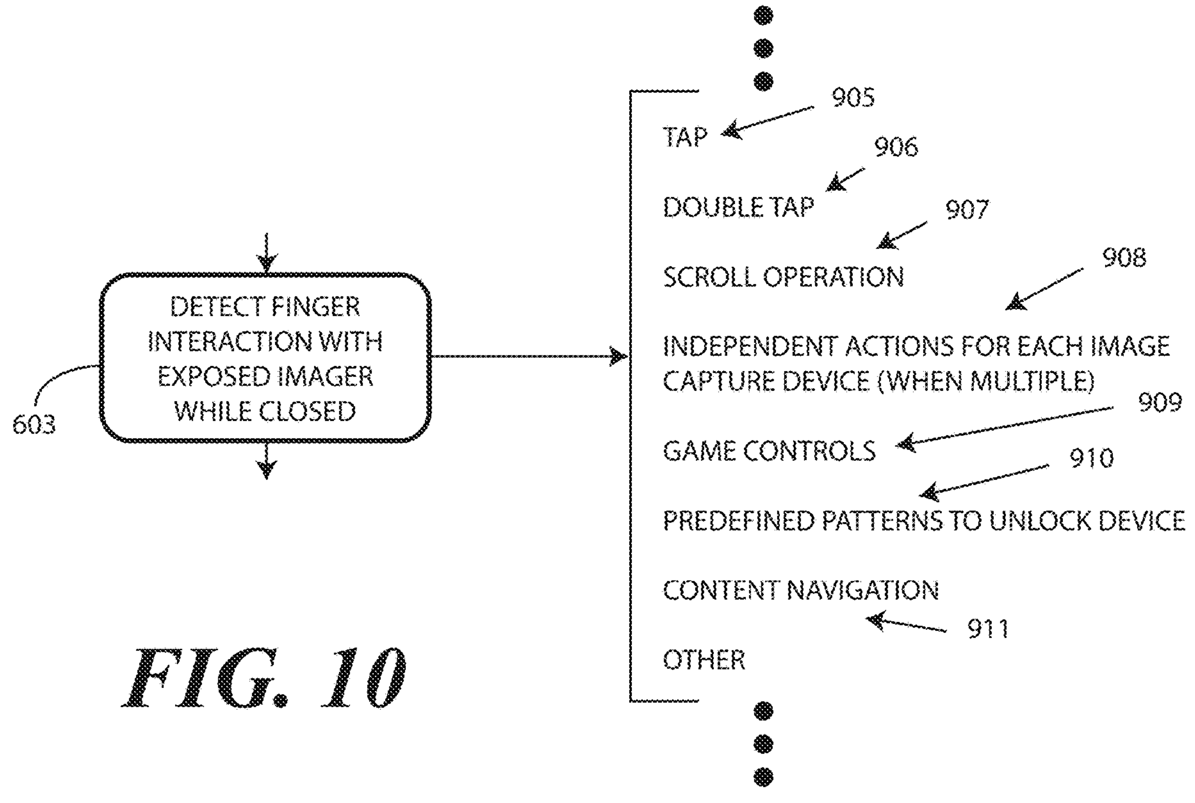
FIG. 10 illustrates one or more method steps in accordance with one or more embodiments of the disclosure.

In one or more embodiments, step 603 comprises detecting, with an image capture device of the electronic device, an object contacting an exterior surface of the electronic device at a location where the image capture device is situated and interacting with image capture device at the location in accordance with a predefined user input motion. The predefined user input motion detected at step 603 can take a variety of forms. Turning briefly to FIG. 10, illustrated therein are several examples. Others will be obvious to those of ordinary skill in the art having the benefit of this disclosure.

At step 603 of FIG. 9, one example of a predefined user input motion detected can be a tap 905, which serves as a versatile control mechanism for various operations of an electronic device. In one use case, a single tap 905 on the image capture device can be configured to unlock the device, providing a quick and intuitive method for users to access their device without needing to press physical buttons or enter a passcode.

Another use case involves using the tap 905 to control media playback. For instance, a single tap could pause or play music or video content, while a double tap 906 might skip to the next track or chapter, enhancing the user's ability to manage media effortlessly.

Additionally, the tap 905 can be employed to navigate through applications or menus, where a tap could select an item or open an application, streamlining the user interface interaction, especially when the device is in a closed position. This functionality is particularly beneficial for foldable devices, where traditional touch inputs may be less accessible, allowing users to perform important operations with minimal effort and maximizing the utility of the device's hardware features.

At step 603 of FIG. 9, another example of a predefined user input motion detected can be a double tap 906, which serves as a versatile control mechanism for various operations of an electronic device. In one use case, a double tap 906 on the image capture device can be configured to switch between different user profiles or modes, allowing users to quickly transition from a work mode to a personal mode without navigating through multiple menus.

Another use case involves using the double tap 906 to activate a voice assistant, providing users with hands-free control over their device's functions, such as setting reminders or sending messages. Additionally, the double tap 906 can be employed to toggle between different connectivity settings, such as enabling or disabling Wi-Fi or Bluetooth, thereby enhancing the user's ability to manage device connectivity efficiently. This functionality is particularly beneficial for foldable devices, where traditional touch inputs may be less accessible, allowing users to perform important operations with minimal effort and maximizing the utility of the device's hardware features.

At step 603 of FIG. 9, yet another example of a predefined user input motion detected can define a scroll operation 907, which serves as a versatile control mechanism for various operations of an electronic device. In one use case, a user can perform a vertical scroll operation 907 by swiping a finger over the image capture device, allowing them to navigate through long documents or web pages without needing to unfold the device, thereby enhancing the convenience and efficiency of content consumption on a foldable device.

Another use case involves using the scroll operation 907 to adjust volume or brightness settings, where a user can swipe up or down to increase or decrease the respective setting, providing a quick and intuitive method for managing device preferences. Additionally, the scroll operation 907 can be employed in gaming applications, where a user can scroll to zoom in or out of a game map, offering a more immersive and interactive gaming experience. This functionality is particularly beneficial for foldable devices, where traditional touch inputs may be less accessible, allowing users to perform important operations with minimal effort and maximizing the utility of the device's hardware features.

At step 603 of FIG. 9, where two image capture devices are situated side by side, the electronic device may be configured to allow finger interactions 908 on each image capture device to control different operations, thereby enhancing the versatility and functionality of the device. For instance, in one use case, a user may interact with the first image capture device to scroll through a list of notifications displayed on the front-facing display, while simultaneously using the second image capture device to adjust the volume of media playback.

Where provided, this dual-control capability allows users to perform multiple tasks efficiently without needing to switch between different modes or interfaces. In another scenario, the first image capture device could be used to navigate through a photo gallery, enabling users to swipe left or right to view previous or next images, while the second image capture device could be employed to apply filters or edit the selected image. This configuration not only streamlines user interaction but also maximizes the utility of the foldable device's hardware, providing a seamless and intuitive user experience.

At step 603 of FIG. 9, another example of a predefined user input motion detected can define a game control operation 909, which serves as a versatile mechanism for enhancing user interaction with gaming applications on an electronic device. In one use case, a user can perform a swipe gesture over the image capture device to control the movement of a character within a game, allowing for intuitive navigation without the need for traditional on-screen controls.

This gesture-based control can be particularly beneficial in action or adventure games where quick and precise movements are important. Another use case involves using a tap gesture 905 to trigger specific in-game actions, such as firing a weapon or jumping over obstacles, providing a more immersive and responsive gaming experience. Additionally, a pinch gesture could be employed to zoom in or out of a game map, offering strategic advantages in games that require spatial awareness and planning. These game control operations 909 not only enhance the gaming experience by providing a more natural and fluid interaction method but also maximize the utility of the device's hardware features, making gaming more engaging and accessible on foldable electronic devices.

At step 603 of FIG. 9, a predefined pattern of movement 910 may be delivered across an image capture device to unlock the device. In one or more embodiments, this process involves the user performing a specific gesture or sequence of gestures over the image capture device, which is configured to detect and interpret these movements as an unlocking command.

The image capture device, equipped with advanced sensors, captures the motion of the user's finger or object as the finger or object moves in a predetermined pattern, such as a swipe or series of taps, across the device's surface. The captured motion data is then processed by the device's processors, which compare the detected pattern against a stored set of predefined patterns associated with unlocking operations. If the detected pattern matches one of the stored patterns, the processors execute an unlocking operation, thereby granting the user access to the device. This method provides a secure and intuitive way to unlock the device, leveraging the image capture device's capabilities to enhance user interaction without the need for traditional input methods like passwords or physical buttons.

In still another embodiment, a predefined user input motion detected at step 603 can define a content navigation operation 911, which serves as a versatile control mechanism for various operations of an electronic device. In one use case, a user can perform a horizontal swipe gesture over the image capture device to navigate through a carousel of images or documents, allowing for efficient browsing without the need to unfold the device, thereby enhancing the convenience and efficiency of content consumption on a foldable device.

Another use case involves using the content navigation operation 911 to switch between different open applications, where a user can swipe left or right to cycle through active apps, providing a quick and intuitive method for multitasking. Additionally, the content navigation operation 911 can be employed to adjust settings within an application, such as changing the font size in a reading app or selecting different filters in a photo editing app, offering a more interactive and user-friendly experience. This functionality is particularly beneficial for foldable devices, where traditional touch inputs may be less accessible, allowing users to perform important operations with minimal effort and maximizing the utility of the device's hardware features.

Turning now back to FIG. 6, in one or more embodiments step 603 further comprises confirming, using one or more proximity sensors, that the object is contacting the exterior surface when interacting with the image capture device at the location in accordance with the predefined user input motion prior to performing the control operation in response to the interaction of the object with the image capture device.

Embodiments of the disclosure contemplate that confirming, using one or more proximity sensors, that the object is contacting the exterior surface when interacting with the image capture device at the location in accordance with the predefined user input motion prior to performing the control operation in response to the interaction of the object with the image capture device can be beneficial for several reasons. First, this process enhances the accuracy and reliability of the user input detection by ensuring that the interaction is intentional and not a result of accidental or environmental factors. This confirmation step helps to prevent false activations that could occur from incidental contact or proximity of objects that are not intended to interact with the device.

Second, by verifying the contact through proximity sensors, the system can distinguish between genuine user inputs and other potential interferences, thereby improving the overall user experience by reducing erroneous operations. This approach also allows for more precise control operations, as the device can accurately interpret the user's intended actions, leading to a more intuitive and seamless interaction with the electronic device.

In one or more embodiments, step 604 comprises correlating, by one or more processors operable with the image capture device, the predefined user input motion with a control operation. In one or more embodiments, the processors operable with the image capture device are configured to correlate predefined user input motions with specific control operations at step 604 by analyzing the input patterns detected by the image capture device.

For instance, when a user covers the camera with a finger in a specific pattern, the processors recognize this as a predefined gesture to unlock the device, thereby initiating an unlocking operation. In another use case, a user might perform a double-tap gesture on the hinge of the foldable device, which the processors interpret as a command to switch the display from a default view to a full-screen mode, enhancing the viewing experience without needing to unfold the device.

Additionally, the processors can detect a shake-up or shake-down motion, using accelerometer data in conjunction with the image capture device, to toggle between different application views or to activate specific functions such as launching a frequently used app. These examples illustrate the versatility of the system in providing intuitive and efficient user interactions by leveraging the image capture device as a multifunctional input mechanism.

In one or more embodiments, the electronic device has more than one image capture device with which a user can interact to control content or other functions of the electronic device. Such was the case in FIGS. 1-5 above, where an image capture device with which a user interacts is one image capture device of a pair of image capture devices comprising a first image capture device and a second image capture device. Where this is the case, correlation of the control operation occurring at step 604 occurs as a function of whether the predefined user input motion interacts with the first image capture device or the second image capture device. A user may be able to scroll content, for example, using a first image capture device and may be able to switch between applications using a second image capture device, and so forth.

In one or more embodiments, step 605 then comprises performing, by the one or more processors, the control operation in response to the interaction of the object with the image capture device. This step 605 can take a variety of forms.

Illustrating by example, when the predefined user input motion defines a predetermined pattern, in one or more embodiments the control operation performed at step 605 will comprise performance of an unlocking operation unlocking the electronic device. In another embodiment, such as when content is presented on the display, the control operation performed at step 605 may comprise controlling the content in accordance with predefined user input motion. Illustrating by example, as will be shown below with reference to FIG. 8, when the content comprises a game and the predefined user input motion controls an element of the game at step 605.

In other embodiments, such as when the predefined user input motion comprises a content navigation instruction, the control operation performed at step 605 may alter the content in accordance with the content navigation instruction. In one or more embodiments, the content navigation instruction comprises a scrolling operation, although other content navigation instructions will be obvious to those of ordinary skill in the art having the benefit of this disclosure.

Figure 7:
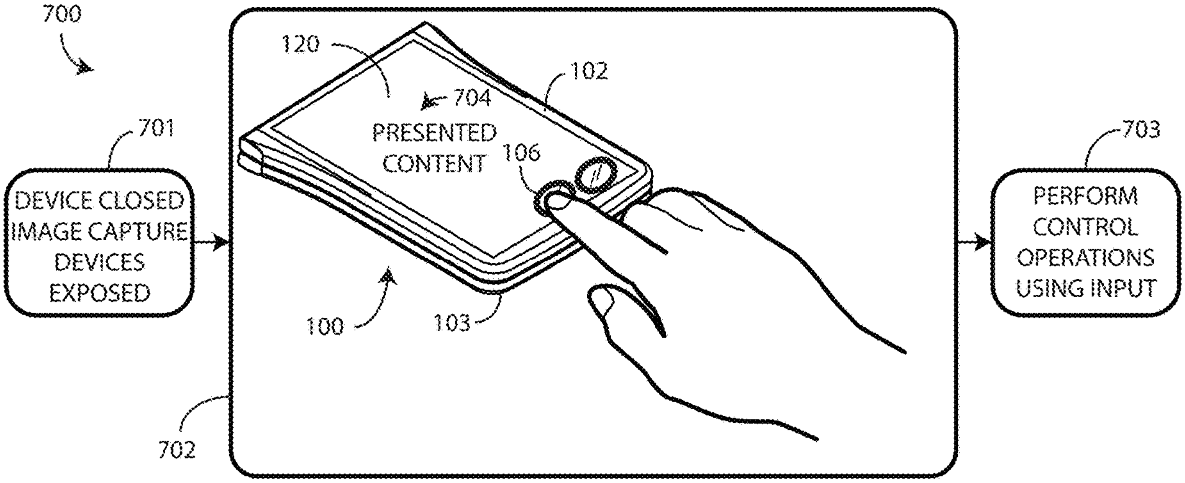
FIG. 7 illustrates one or more method steps in accordance with one or more embodiments of the disclosure.

One example of the method 600 of FIG. 6 in practice is shown in the method 700 of FIG. 7. Turning now to FIG. 7, at step 701 the electronic device 100 is in the closed position. While only shown generally, in this example the front facing display 120 is presenting content 704. In one or more embodiments, one or more sensors (124) of the electronic device 100 detect this geometric form factor where the first device housing 102 and the second device housing are in the closed position at step 701.

As shown at step 702, in one or more embodiments the electronic device 100 includes a front facing display 120 that is exposed for all geometric form factors. At least one image capture device 106 is situated within a display perimeter of the front facing display 120.

At step 702, the at least one image capture device 106, which is exposed both when the first device housing 102 that is pivotable about a hinge relative to a second device housing 103 between an axially displaced open position and a closed position are in the axially displaced open position and in the closed position, detects user input from an object interacting with the at least one image capture device 106 while the first device housing 102 is pivoted relative to the second device housing 103 to the closed position. In this example, the object is a user's finger.

At step 703, one or more processors (109) of the electronic device 100 control content 704 presented on the front facing display 120, which is also exposed both when the first device housing 102 and the second device housing 103 are in the axially displaced open position and the closed position in accordance with the user input. In one or more embodiments, step 703 comprises confirming, by the one or more processors (109), that the object is interacting with the image capture device 106 by determining a distance between a surface of the electronic device 100 where the image capture device 106 is situated and the object.

Where optional step (601) from the method (600) of FIG. 6 was included, step 703 could comprise precluding, by the one or more processors (109), the controlling unless other predefined user input was received prior to the user input transitioning the image capture device 106 to a user interface control mode of operation. This would prevent unintended control operations from being performed unless the user specifically wanted the image capture device 106 to be used as a user interface control device. A method describing this is illustrated below in FIG. 11.

Figure 8:
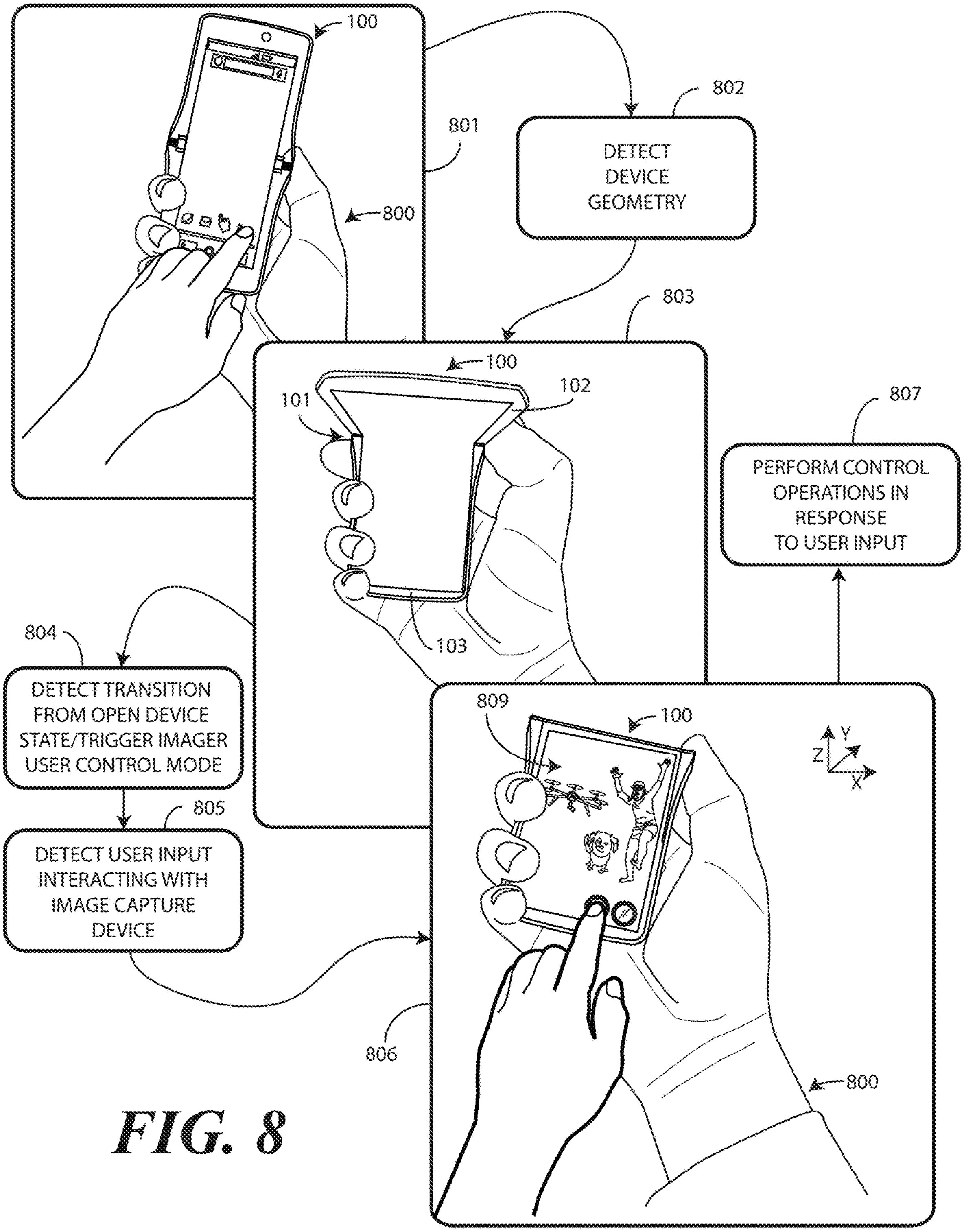
FIG. 8 illustrates another explanatory method in accordance with one or more embodiments of the disclosure.

Turning first to FIG. 8, illustrated therein are one or more method steps in accordance with one or more embodiments of the disclosure. Beginning at step 801, a user 800 is depicted interacting with the rear-facing display of an electronic device 100 in the axially displaced open position.

In this illustrative example, the user 800 is engaged in a creative digital art project, utilizing the expansive display to sketch intricate designs with a finger. The axially displaced open position is necessary for this activity as it provides a flat, tablet-like surface, maximizing the display area and offering a stable platform for precise input.

This configuration allows the user to fully leverage the high-resolution display and touch sensitivity, facilitating detailed work that requires a broad canvas and unobstructed view. The open position also enables the user to comfortably rest their hand on the device without inadvertently triggering other functions, thereby enhancing the overall user experience and efficiency in executing complex artistic tasks.

At step 802 of FIG. 8, one or more inertial motion units are employed to monitor the state of the electronic device, specifically determining whether the device is in an open or closed position. These inertial motion units, which may include a combination of accelerometers, gyroscopes, and magnetometers, are strategically positioned within the device's housing to accurately detect changes in orientation and movement. By analyzing the data from these sensors, the system can ascertain the angular position of the device housings relative to each other, thereby identifying whether the device is folded closed or unfolded open. This capability allows the device to automatically adjust its functionality and user interface based on the physical configuration, enhancing the user experience by providing context-aware operations.

At step 803, the user transitions the electronic device 100 from the axially displaced open position to the closed position by pivoting the first device housing 102 about a hinge 101 relative to the second device housing 103. In this illustrative example, this action is performed after completing the creative digital art project at step 801, where the user 800 utilized the expansive display for intricate design work.

In this fictional scenario, the transition to the closed position serves a practical purpose: it allows the user to celebrate the completion of the monumental project by playing a game 809, which is shown at step 806. Additionally, closing the electronic device 100 conserves battery life by deactivating the large display, which is no longer needed once the project is finished. This transition also facilitates easy portability, enabling the user to carry the device conveniently without the risk of damaging the artwork or the device itself. By folding the device, the user ensures that the creative work remains intact and secure, ready for future viewing or sharing. This closing operation is detected by one or more flex sensors at step 804.

Before stowing the electronic device, however, the user 800 wants a little "me time" playing the game. Accordingly, as shown at step 806 the user 800 delivers user input to an image capture device that is exposed when the electronic device 100 is in the closed position. At step 805, one or more processors of the electronic device 100 detect user input from an object interacting with the image capture device while the first device housing is pivoted relative to the second device housing to the closed position.

In this illustrative embodiment, the user input defines a control operation for an element of the game 809. Accordingly, at step 805 the one or more processors, using signals from the at least one image capture device, to detect an object interacting with the at least one image capture device in accordance with a user input motion by contacting a surface of the electronic device where the at least one image capture device is situated and perform, in response to the object interacting with the at least one image capture device, a control operation associated with the user input motion to control the game 809 at step 807.

Figure 11:
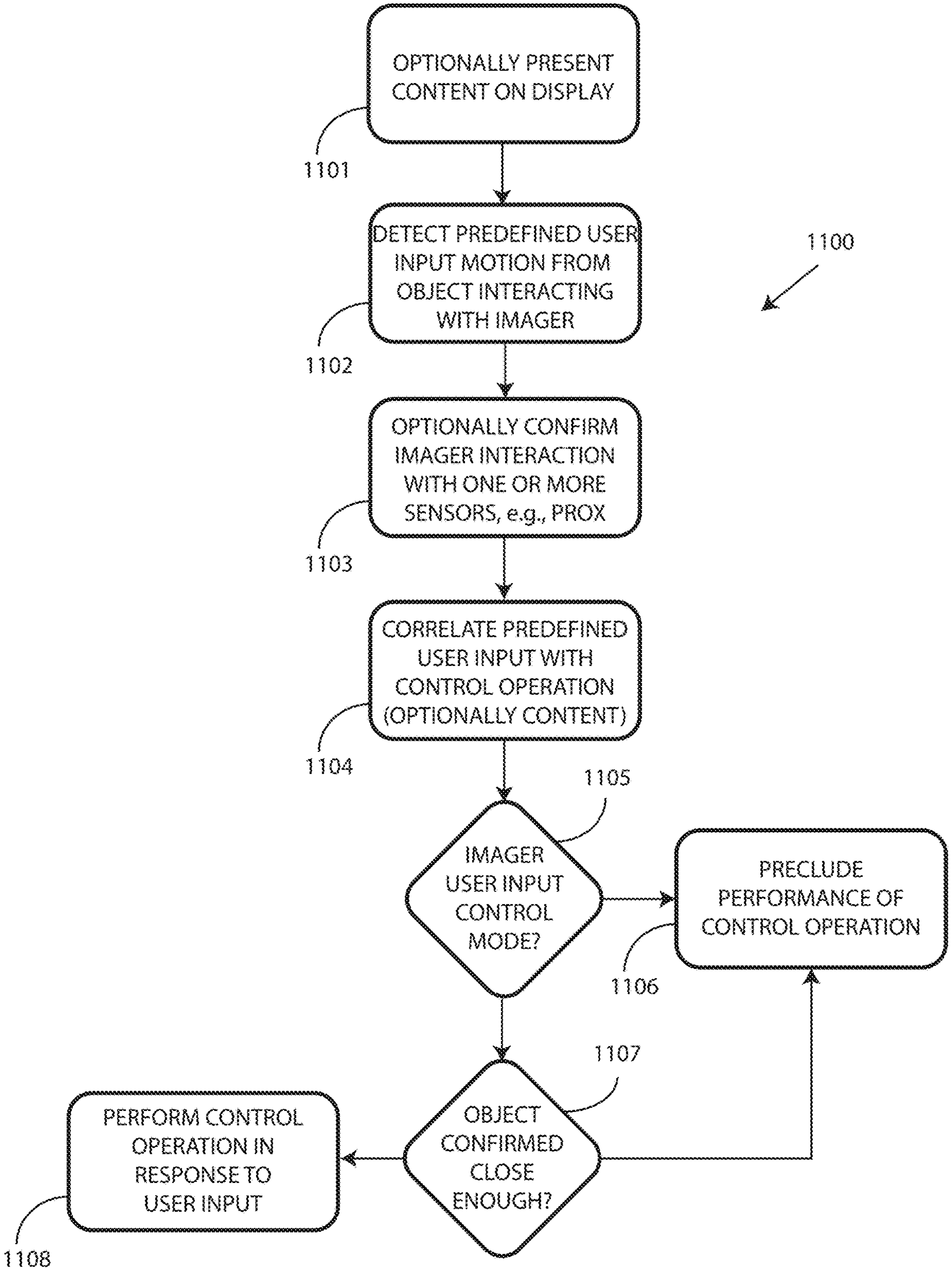
FIG. 11 illustrates another explanatory method in accordance with one or more embodiments of the disclosure.

Turning now to FIG. 11, illustrated therein is another explanatory method 1100 in accordance with one or more embodiments of the disclosure. At step 1101, content is presented on a display of the electronic device.

To illustrate by example, the content may be specifically designed to facilitate user navigation through notifications while the device is in a closed position. The display, which remains exposed even when the device is closed, showcases a streamlined interface where notifications are presented in a concise, yet informative manner. Each notification might be displayed with a brief summary, including the app icon, a short description of the notification content, and the time of receipt, allowing the user to quickly assess the importance of each alert.

For instance, a notification from a messaging application might show the sender's name and the first few words of the message, while a calendar alert could display the event title and start time. This setup enables the user to efficiently determine whether any notifications warrant opening the device to an axially displaced open position for further inquiry, thereby enhancing the user experience by providing immediate access to important information without the need to unfold the device.

At step 1102, the method 1100 involves detecting an object contacting an exterior surface of the electronic device using an image capture device situated at that location. This detection is achieved by the image capture device capturing the interaction of the object, such as a user's finger, with the device's surface in accordance with a predefined user input motion. The method 1103 may confirm that the object is actually touching a surface of the electronic device where the image capture device is located at step 1103.

To continue the notification example, a user may deliver a predefined motion specifically designed to navigate through notifications displayed at step 1101. The image capture device, equipped with advanced sensors, interprets the motion pattern, such as a swipe or tap, to execute navigation commands at step 1104. Illustrating by example, in one or more embodiments step 1104 comprises correlating, by one or more processors operable with the image capture device, the predefined user input motion with a control operation. This interaction allows the user to efficiently scroll through or select notifications without needing to unfold the device, thereby enhancing the user experience by providing seamless access to important information while the device remains in a compact form.

In decision 1105 of FIG. 11, the determination of whether the image capture device receiving user input at step 1103 has been transitioned to a user interface control mode of operation involves assessing whether a specific activation gesture or condition has been met. This transition is generally triggered by predefined user actions, such as a tap on the hinge, a shake motion, or contextually determined by artificial intelligence based on user behavior patterns.

The benefit of this approach is that it prevents unintended activations of the user interface control mode, ensuring that the image capture device only responds to deliberate user inputs. This enhances the reliability and precision of the device's response, reducing the likelihood of accidental operations that could disrupt the user experience. By requiring a specific gesture or condition to activate the control mode, the system can more accurately distinguish between intentional interactions and incidental contact, thereby providing a more intuitive and user-friendly interface.

Where the image capture device is not transitioned to a user interface control mode of operation, step 1106 comprises precluding any control operation from occurring. Said differently, in one or more embodiments step 1106 comprises precluding, by the one or more processors, the controlling unless other predefined user input was received prior to the user input transitioning the image capture device to a user interface control mode of operation.

Otherwise, in the method 1100 of FIG. 11, decision 1107 confirms, by the one or more processors, that the object is interacting with the image capture device by determining a distance between a surface of the electronic device where the image capture device is situated and the object. Where it is not, the preclusion of step 1106 occurs. Otherwise, step 1108 comprises performing, by the one or more processors, the control operation in response to the interaction of the object with the image capture device. In one or more embodiments, this step 1108 comprises controlling, by one or more processors, content presented on a display that is also exposed both when the first device housing and the second device housing are in the axially displaced open position and the closed position in accordance with the user input.

Figure 12:
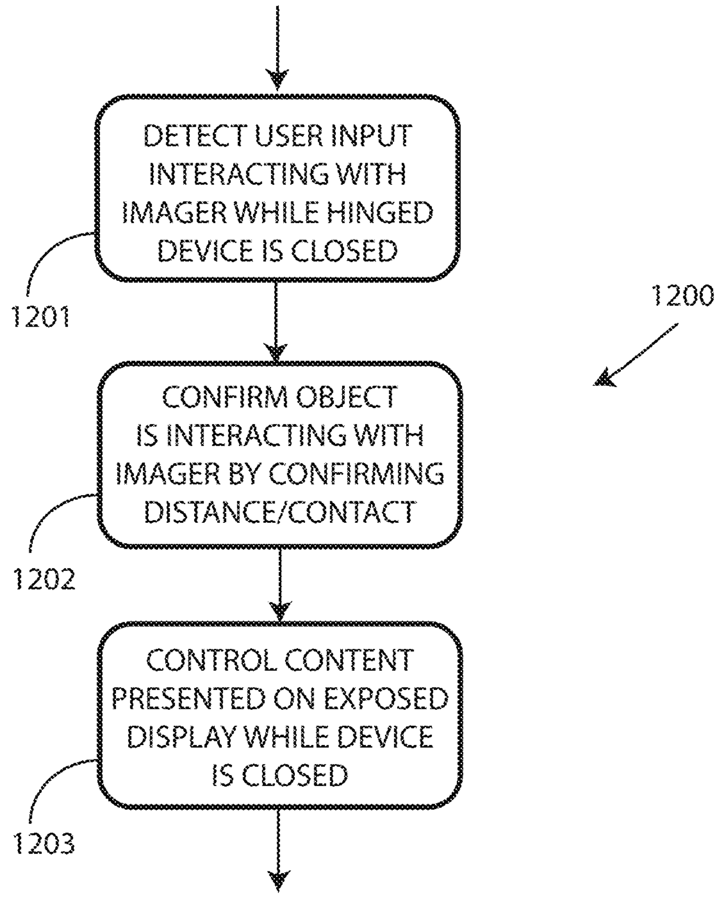
FIG. 12 illustrates still another explanatory method in accordance with one or more embodiments of the disclosure.

Turning now to FIG. 12, illustrated therein is another explanatory method 1200 in accordance with one or more embodiments of the disclosure. In one or more embodiments, Step 1201 comprises detecting, with an image capture device that is exposed both when a first device housing that is pivotable about a hinge relative to a second device housing between an axially displaced open position and a closed position are in the axially displaced open position and in the closed position, user input from an object interacting with the image capture device while the first device housing is pivoted relative to the second device housing to the closed position.

In one or more embodiments, step 1202 comprises confirming, by the one or more processors, that the object is interacting with the image capture device by determining a distance between a surface of the electronic device where the image capture device is situated and the object. In one or more embodiments, step 1203 comprises controlling, by one or more processors, content presented on a display that is also exposed both when the first device housing and the second device housing are in the axially displaced open position and the closed position in accordance with the user input.

Figure 13:
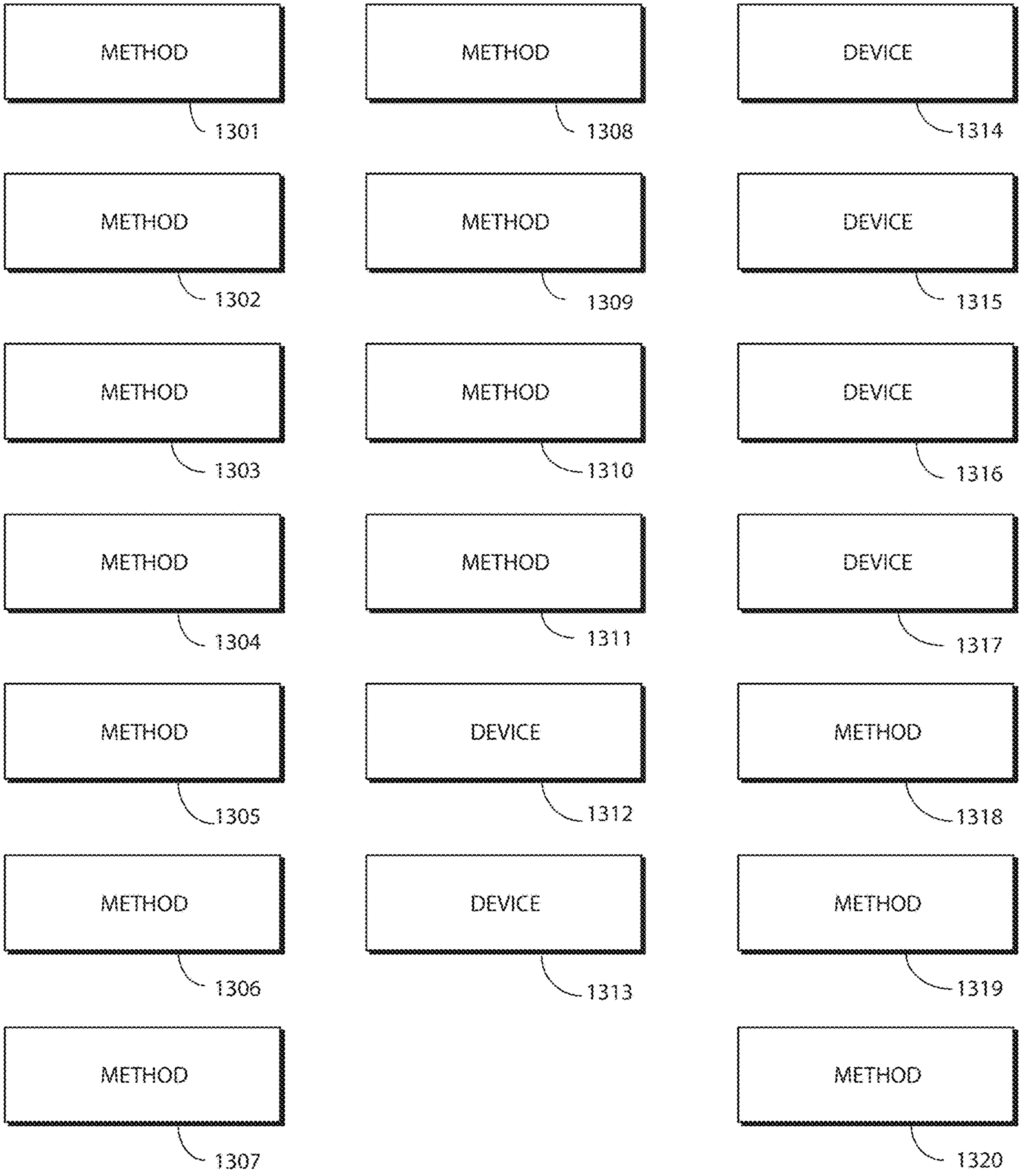
FIG. 13 illustrates embodiments of the disclosure.

Turning now to FIG. 13, illustrated therein are various embodiments of the disclosure. The embodiments of FIG. 13 are shown as labeled boxes in FIG. 13 due to the fact that the individual components of these embodiments have been illustrated in detail in FIGS. 1-12, which precede FIG. 13. Accordingly, since these items have previously been illustrated and described, their repeated illustration is no longer essential for a proper understanding of these embodiments. Thus, the embodiments are shown as labeled boxes.

At 1301, a method in an electronic device comprises detecting, with an image capture device of the electronic device, an object contacting an exterior surface of the electronic device at a location where the image capture device is situated and interacting with image capture device at the location in accordance with a predefined user input motion. At 1301, the method comprises correlating, by one or more processors operable with the image capture device, the predefined user input motion with a control operation.

At 1301, the method comprises w performing, by the one or more processors, the control operation in response to the interaction of the object with the image capture device. At 1302, the predefined user input motion of 1301 defines a predetermined pattern, and the control operation comprises an unlocking operation unlocking the electronic device.

At 1303, the method of 1301 further comprises presenting content on a display spanning the location, wherein the control operation comprises controlling the content in accordance with predefined user input motion. At 1304, the content of 1303 comprises a game and the predefined user input motion controls an element of the game.

At 1305, the predefined user input motion of 1303 comprises a content navigation instruction and the control operation alters the content in accordance with the content navigation instruction. At 1306, the content navigation instruction of 1305 comprises a scrolling operation.

At 1307, the image capture device of 1301 is one image capture device of a pair of image capture devices comprising a first image capture device and a second image capture device/At 1307, correlation of the control operation occurs as a function of whether the predefined user input motion interacts with the first image capture device or the second image capture device.

At 1308, the method of 1301 further comprises detecting, by one or more sensors of the electronic device, other user input transitioning the image capture device to a user interface control mode of operation prior to performing the control operation in response to the interaction of the object with the image capture device. At 1309, the other user input of 1308 comprises a tapping gesture being delivered to a hinge housing situated between a first device housing and a second device housing about which the first device housing and second device housing can transition between an axially displaced open position and a closed position. At 1310, the other user input of 1308 moves the electronic device up and down in three-dimensional space in a chop-chop motion.

At 1311, the method of 1301 further comprises confirming, using one or more proximity sensors, that the object is contacting the exterior surface when interacting with the image capture device at the location in accordance with the predefined user input motion prior to performing the control operation in response to the interaction of the object with the image capture device.

At 1312, an electronic device comprises at least one image capture device, at least one display, and one or more processors operable with the at least one image capture device and the at least one display. At 1312, the one or more processors are configured, using signals from the at least one image capture device, to detect an object interacting with the at least one image capture device in accordance with a user input motion by contacting a surface of the electronic device where the at least one image capture device is situated. At 1312, the one or more processors are configured to perform, in response to the object interacting with the at least one image capture device, a control operation associated with the user input motion.

At 1313, the electronic device of 1312 comprises a first device housing that is pivotable relative to a second device housing between a closed position and an axially displaced open position. At 1314, the at least one display of 1313 and the at least one image capture device are coupled to the first device housing and are each exposed both when the first device housing and the second device housing are in the closed position and when the first device housing and the second device housing are in the axially displaced open position.

At 1315, the at least one display of 1314 defines a display perimeter and the at least one image capture device is situated within the display perimeter. At 1316, the at least one image capture device of 1315 comprises a first image capture device and a second image capture device, each situated within the display perimeter. At 1317, the one or more processors of 1316 are configured to perform, in response to the object interacting with the at least one image capture device, the control operation associated with the user input motion only when the electronic device is in the closed position.

At 1318, a method in an electronic device comprises detecting, with an image capture device that is exposed both when a first device housing that is pivotable about a hinge relative to a second device housing between an axially displaced open position and a closed position are in the axially displaced open position and in the closed position, user input from an object interacting with the image capture device while the first device housing is pivoted relative to the second device housing to the closed position. At 1318, the method comprises controlling, by one or more processors, content presented on a display that is also exposed both when the first device housing and the second device housing are in the axially displaced open position and the closed position in accordance with the user input.

At 1319, the method of 1318 further comprises confirming, by the one or more processors, that the object is interacting with the image capture device by determining a distance between a surface of the electronic device where the image capture device is situated and the object. At 1320, the method of 1318 further comprises precluding, by the one or more processors, the controlling unless other predefined user input was received prior to the user input transitioning the image capture device to a user interface control mode of operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, in alternate embodiments, an electronic device may comprise multiple image capture devices strategically positioned around the device's perimeter, enhancing the ability to detect user input motions from various angles and orientations. This configuration allows for more precise and responsive interaction, as the device can better interpret complex gestures involving multiple points of contact or motion paths.

Additionally, the alternate embodiments may include advanced processors with enhanced computational capabilities, enabling faster processing of input signals and more sophisticated gesture recognition algorithms. These processors can support a broader range of user-defined gestures, providing users with a more customizable and intuitive interaction experience.

Furthermore, the display in these alternate embodiments may be a flexible or foldable screen, which can dynamically adjust the interface based on the detected user input motion, offering a seamless transition between different modes of operation and maximizing the utility of the device's form factor. These enhancements collectively improve the device's functionality, making the device more adaptable to diverse user needs and preferences.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

detecting, with an image capture device of the electronic device that is either a front-facing image capture device configured to capture images of front-facing subjects or a rear-facing image capture device configured to capture images of rear-facing subjects, an object contacting an exterior surface of the electronic device at a location where the image capture device is situated and interacting with image capture device at the location in accordance with a predefined user input motion;

correlating, by one or more processors operable with the image capture device, the predefined user input motion with a control operation; and performing, by the one or more processors, the control operation in response to interaction of the object with the image capture device;

wherein the electronic device comprises a first device housing that is pivotable relative to a second device housing between a closed position and an axially displaced open position and the performing the control operation in response to the interaction of the object with the image capture device occurs only when the electronic device is in the closed position.

2. The method of claim 1, wherein the predefined user input motion defines a predetermined pattern, and the control operation comprises an unlocking operation unlocking the electronic device.

3. The method of claim 1, further comprising presenting content on a display spanning the location, wherein the control operation comprises controlling the content in accordance with predefined user input motion.

4. The method of claim 3, wherein the content comprises a game and the predefined user input motion controls an element of the game.

5. The method of claim 3, wherein the predefined user input motion comprises a content navigation instruction and the control operation alters the content in accordance with the content navigation instruction.

6. The method of claim 1, wherein the image capture device comprises one of a wide field of view image capture device or a telephoto image capture device.

7. The method of claim 1, wherein the image capture device is one image capture device of a pair of image capture devices comprising a first image capture device and a second image capture device, wherein correlation of the control operation occurs as a function of whether the predefined user input motion interacts with the first image capture device or the second image capture device.

8. The method of claim 1, further comprising detecting, by one or more sensors of the electronic device, other user input transitioning the image capture device to a user interface control mode of operation prior to performing the control operation in response to the interaction of the object with the image capture device.

9. The method of claim 8, wherein the other user input comprises a tapping gesture being delivered to a hinge housing situated between the first device housing and the second device housing.

10. The method of claim 8, wherein the other user input moves the electronic device up and down in three-dimensional space in a chop-chop motion.

11. The method of claim 1, further comprising confirming, using one or more proximity sensors, that the object is contacting the exterior surface when interacting with the image capture device at the location in accordance with the predefined user input motion prior to performing the control operation in response to the interaction of the object with the image capture device.

12. An electronic device, comprising:

at least one image capture device configured as a camera to either capture images of front-facing subjects or rear-facing subjects relative to the electronic device;

at least one display; and one or more processors operable with the at least one image capture device and the at least one display;

wherein:

the one or more processors are configured, using signals from the at least one image capture device, to detect an object interacting with the at least one image capture device in accordance with a user input motion by contacting a surface of the electronic device where the at least one image capture device is situated and perform, in response to the object interacting with the at least one image capture device, a control operation associated with the user input motion;

the electronic device comprises a first device housing that is pivotable relative to a second device housing between a closed position and an axially displaced open position; and the one or more processors are configured to perform, in response to the object interacting with the at least one image capture device, the control operation associated with the user input motion only when the electronic device is in the closed position.

13. The electronic device of claim 12, wherein the at least one image capture device comprises a plurality of image capture devices.

14. The electronic device of claim 13, wherein the at least one display and the at least one image capture device are coupled to the first device housing and are each exposed both when the first device housing and the second device housing are in the closed position and when the first device housing and the second device housing are in the axially displaced open position.

15. The electronic device of claim 14, wherein the at least one display defines a display perimeter and the at least one image capture device is situated within the display perimeter.

16. The electronic device of claim 15, wherein the at least one image capture device comprises a wide field of view image capture device and a telephoto image capture device, each situated within the display perimeter.

17. The electronic device of claim 16, wherein the control operation comprises one of an unlocking operation, a content control operation, a character control operation, a gaming action operation, a zooming operation, or a content altering operation.

18. A method in an electronic device, the method comprising:

detecting, with an image capture device that is one of a wide field of view camera or a telephoto camera and that is exposed both when a first device housing that is pivotable about a hinge relative to a second device housing between an axially displaced open position and a closed position are in the axially displaced open position and in the closed position, user input from an object interacting with the image capture device while the first device housing is pivoted relative to the second device housing to the closed position;

controlling, by one or more processors, content presented on a display that is also exposed both when the first device housing and the second device housing are in the axially displaced open position and the closed position in accordance with the user input; and confirming, by the one or more processors, that the object is interacting with the image capture device by determining a distance between a surface of the electronic device where the image capture device is situated and the object.

19. The method of claim 18, wherein one or more processors control the content by performing a content navigation operation.

20. A method in an electronic device, the method comprising:

detecting, with an image capture device that is one of a wide field of view camera or a telephoto camera and that is exposed both when a first device housing that is pivotable about a hinge relative to a second device housing between an axially displaced open position and a closed position are in the axially displaced open position and in the closed position, user input from an object interacting with the image capture device while the first device housing is pivoted relative to the second device housing to the closed position;

controlling, by one or more processors, content presented on a display that is also exposed both when the first device housing and the second device housing are in the axially displaced open position and the closed position in accordance with the user input; and precluding, by the one or more processors, the controlling unless other predefined user input was received prior to the user input transitioning the image capture device to a user interface control mode of operation.

* * * * *